US012683746B2

(12) United States Patent
Dutta et al.

(10) Patent No.: US 12,683,746 B2
(45) Date of Patent: Jul. 14, 2026

(54) CONTROL INFORMATION FOR SIDELINK SPATIAL DOMAIN MULTIPLEXING FROM MULTIPLE TRANSMISSION RECEPTION POINTS (TRPS)

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Hui Guo, Beijing (CN); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 382 days.

(21) Appl. No.: 18/245,988

(22) PCT Filed: Nov. 6, 2020

(86) PCT No.: PCT/CN2020/127034
§ 371 (c)(1),
(2) Date: Mar. 20, 2023

(87) PCT Pub. No.: WO2022/094914
PCT Pub. Date: May 12, 2022

(65) Prior Publication Data
US 2023/0353325 A1      Nov. 2, 2023

(51) Int. Cl.
H04W 92/18 (2009.01)
H04L 1/00 (2006.01)
(Continued)

(52) U.S. Cl.
CPC .......... H04L 5/0055 (2013.01); H04L 1/0003 (2013.01); H04L 1/0009 (2013.01); H04L 1/1812 (2013.01); H04W 92/18 (2013.01)

(58) Field of Classification Search
CPC ... H04L 5/0055; H04L 1/0003; H04L 1/0009; H04L 1/1812; H04L 5/0044;
(Continued)

(56) References Cited

U.S. PATENT DOCUMENTS

2019/0059058 A1      2/2019   Chen et al.
2019/0230691 A1 *   7/2019   Cao ....................... H04L 5/0042
(Continued)

FOREIGN PATENT DOCUMENTS

CN          111769918 A          10/2020
WO      WO-2019173650            9/2019
WO          2020198616 A1      10/2020

OTHER PUBLICATIONS

Huawei, et al., "Sidelink Physical Layer Procedures for NR V2X", 3GPP TSG RAN WG1 Meeting #99, R1-1911887, Reno, USA, Nov. 18, 2019-Nov. 22, 2019, Nov. 9, 2019, 30 Pages.
(Continued)

*Primary Examiner* — Edan Orgad
*Assistant Examiner* — Malick A Sohrab
(74) *Attorney, Agent, or Firm* — Holland & Hart LLP

(57) ABSTRACT

Methods, systems, and devices for wireless communication at a user equipment (UE) are described. A first user equipment (UE) may transmit, to a second UE, sidelink control information (SCI) including an indication of resources and a number of spatial layers for a sidelink transmission. The first UE may perform spatial domain multiplexing (SDM) between the spatial layers. The first UE may transmit a first data packet associated with the first spatial layer from a first transmission reception point (TRP) and may transmit a second data packet associated with a second spatial layer from a second TRP. In some examples, the first UE may include a first and second stage of the SCI, such that the first SCI corresponds to shared information for all spatial layers
(Continued)

Transmit sidelink control information signaling a set of resources and a number of spatial layers for a sidelink transmission by the UE, wherein the sidelink control information comprises an indication of spatial domain multiplexing between a first spatial layer of the sidelink transmission and a second spatial layer of the sidelink transmission ⎫ 1005

Transmit a first data packet over the first spatial layer of the sidelink transmission from a first transmission/reception point (TRP) using the set of resources and based at least in part on the indication of spatial domain multiplexing ⎫ 1010

Transmit a second data packet over the second spatial layer of the sidelink transmission from a second TRP using the set of resources and based at least in part on the indication of spatial domain multiplexing ⎫ 1015

1000 and the second stage of the SCI corresponds to separate information for each spatial layer.

30 Claims, 13 Drawing Sheets

(51) Int. Cl.
*H04L 1/1812* (2023.01)
*H04L 5/00* (2006.01)
(58) Field of Classification Search
CPC ... H04L 5/0048; H04L 5/0064; H04L 5/0023; H04L 5/0053; H04W 92/18; H04B 7/0404; H04B 7/0408; H04B 7/06954; H04B 7/0697
See application file for complete search history.

(56) References Cited

U.S. PATENT DOCUMENTS

| | | | |
|---|---|---|---|
| 2020/0029318 A1 | 1/2020 | Guo | |
| 2020/0029340 A1* | 1/2020 | He | H04W 72/044 |
| 2020/0146094 A1 | 5/2020 | Wu et al. | |
| 2020/0304159 A1* | 9/2020 | Liao | H04J 11/0036 |
| 2021/0352597 A1* | 11/2021 | Do | H04W 52/52 |
| 2022/0124515 A1* | 4/2022 | Castaneda | H04W 16/28 |
| 2022/0330038 A1* | 10/2022 | Ganesan | H04W 8/005 |
| 2023/0104600 A1* | 4/2023 | Ali | H04W 74/0816 370/329 |
| 2023/0284257 A1* | 9/2023 | Hui | H04W 72/02 370/329 |
| 2023/0361955 A1* | 11/2023 | Ganesan | H04B 7/06954 |

OTHER PUBLICATIONS

AT&T: "Considerations on Scenarios for Multi-Beam Enhancements," 3GPP TSG RAN Plenary Meeting #82, RP-1812453, Sorrento, Italy, Dec. 10-13, 2018 (Dec. 13, 2018), 3 pages, the whole document.
International Search Report and Written Opinion—PCT/CN2020/127034—ISA/EPO—Aug. 4, 2021.
InterDigital Inc: "Discussion on Physical Layer Structure for NR V2X Sidelink", 3GPP TSG RAN WG1 #97, R1-1907091, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019, 14 Pages, XP051728537, p. 1-p. 9.
Supplementary European Search Report—EP20960375—Search Authority—Munich—Jul. 24, 2024.

* cited by examiner

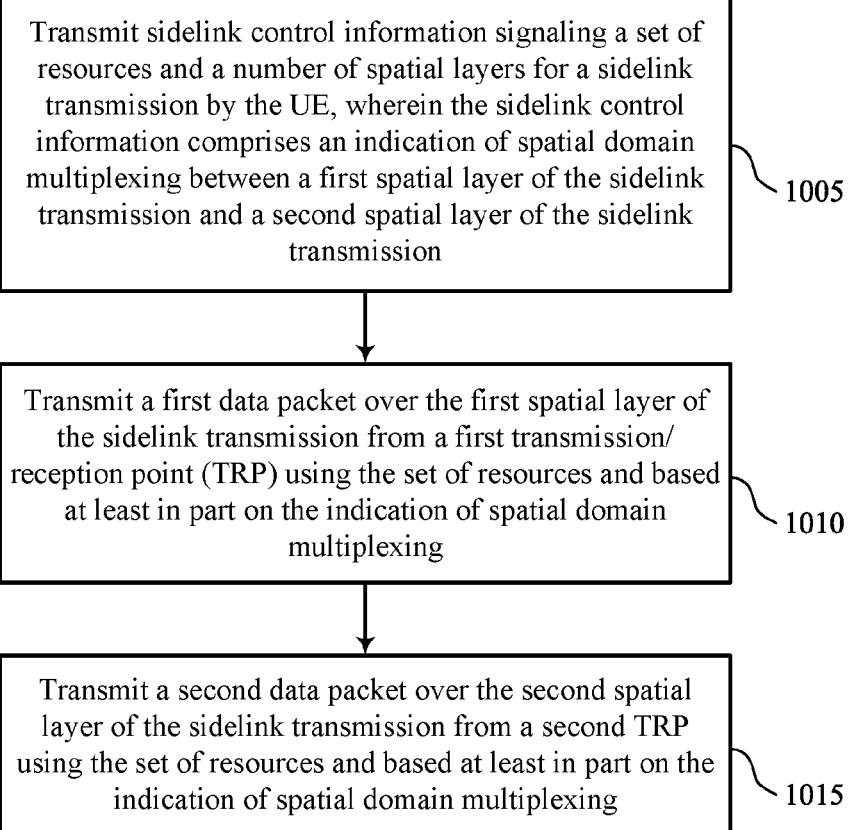

Transmit sidelink control information signaling a set of resources and a number of spatial layers for a sidelink transmission by the UE, wherein the sidelink control information comprises an indication of spatial domain multiplexing between a first spatial layer of the sidelink transmission and a second spatial layer of the sidelink transmission

1005

Transmit a first data packet over the first spatial layer of the sidelink transmission from a first transmission/reception point (TRP) using the set of resources and based at least in part on the indication of spatial domain multiplexing

1010

Transmit a second data packet over the second spatial layer of the sidelink transmission from a second TRP using the set of resources and based at least in part on the indication of spatial domain multiplexing

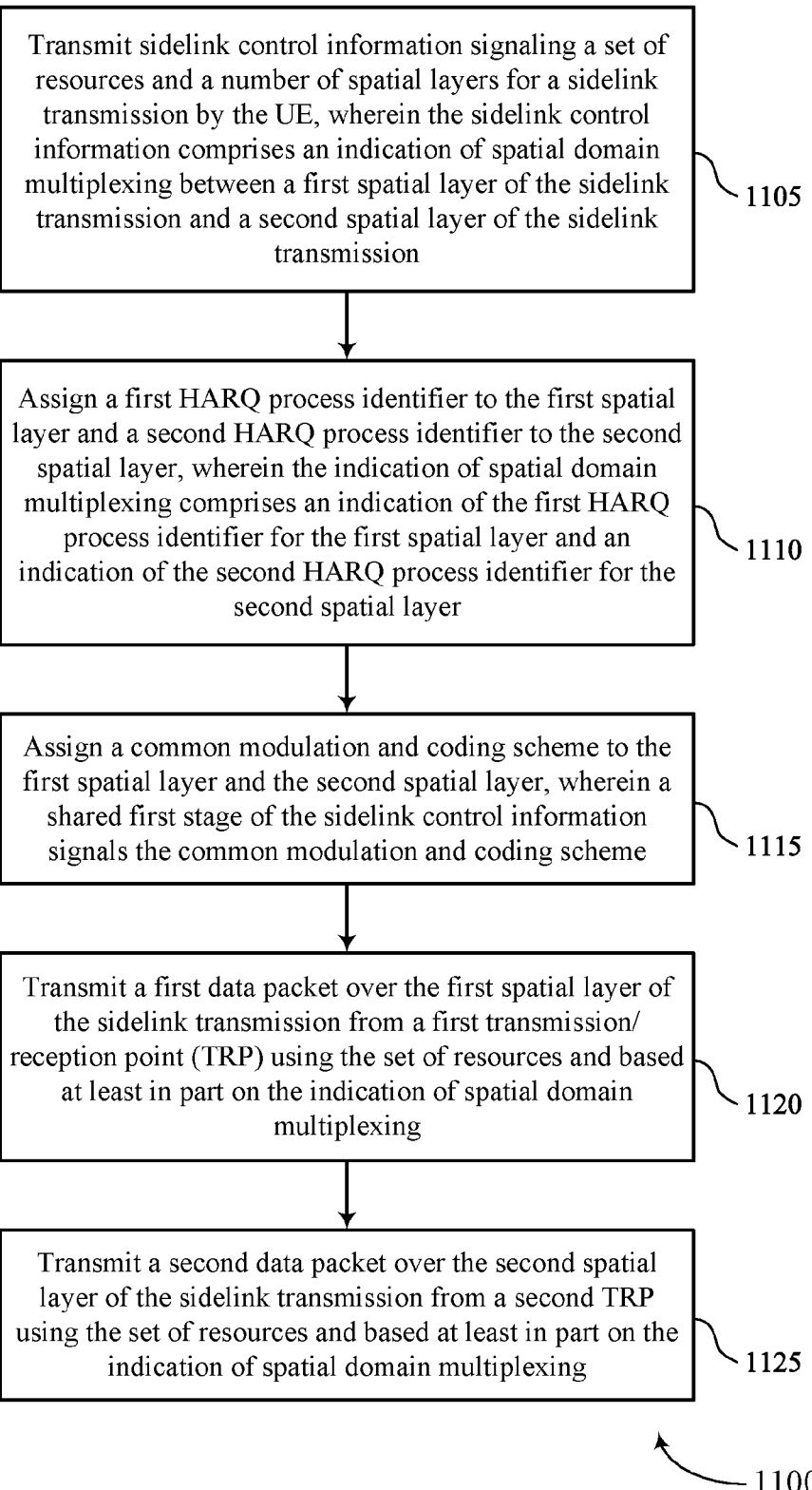

Transmit sidelink control information signaling a set of resources and a number of spatial layers for a sidelink transmission by the UE, wherein the sidelink control information comprises an indication of spatial domain multiplexing between a first spatial layer of the sidelink transmission and a second spatial layer of the sidelink transmission

1105

Assign a first HARQ process identifier to the first spatial layer and a second HARQ process identifier to the second spatial layer, wherein the indication of spatial domain multiplexing comprises an indication of the first HARQ process identifier for the first spatial layer and an indication of the second HARQ process identifier for the second spatial layer

1110

Assign a common modulation and coding scheme to the first spatial layer and the second spatial layer, wherein a shared first stage of the sidelink control information signals the common modulation and coding scheme

1115

Transmit a first data packet over the first spatial layer of the sidelink transmission from a first transmission/ reception point (TRP) using the set of resources and based at least in part on the indication of spatial domain multiplexing

1120

Transmit a second data packet over the second spatial layer of the sidelink transmission from a second TRP using the set of resources and based at least in part on the indication of spatial domain multiplexing

CONTROL INFORMATION FOR SIDELINK SPATIAL DOMAIN MULTIPLEXING FROM MULTIPLE TRANSMISSION RECEPTION POINTS (TRPS)

CROSS REFERENCE

The present application is a 371 national stage filing of International PCT Application No. PCT/CN2020/127034 by DUTTA et al. entitled "CONTROL INFORMATION FOR SIDELINK SPATIAL DOMAIN MULTIPLEXING FROM MULTIPLE TRANSMISSION RECEPTION POINTS (TRPS)," filed Nov. 6, 2020, which is assigned to the assignee hereof, and which is expressly incorporated by reference in its entirety herein.

FIELD OF TECHNOLOGY

The following relates to wireless communication at a user equipment (UE), including control information for sidelink spatial domain multiplexing from multiple transmission reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support UEs with multiple transmission/reception points (TRPs), which may be spatially separated. In some cases, a multi-TRP UE may transmit and receive in different directions using each TRP, and transmissions from different TRPs may have different directional characteristics.

SUMMARY

The described techniques relate to improved methods, systems, devices, and apparatuses that support control information for sidelink spatial domain multiplexing from multiple transmission reception points (TRPs). Generally, the described techniques enable a multi-TRP user equipment (UE) to communicate with other UEs over a sidelink connection using spatial domain multiplexing (SDM). A multi-TRP UE (such as a vehicle) may use common control information to schedule sidelink packets for simultaneous transmission by spatially separated TRPs. For example, a multi-TRP UE may determine that two data packets may be spatially multiplexed, and may select overlapping sidelink resources (e.g., time resources, frequency resources, or the like) to use for transmitting both data packets to one or more other UEs. A different spatial layer may be mapped to each data packet. In some examples, the multi-TRP UE may select resources such that the SDM transmissions are scheduled on the same transmission time interval (TTI) or subframe. The multi-TRP UE may transmit sidelink control information to the other UEs, which may include common and separate parameters for each spatial layer and/or data packet. Simultaneous SDM transmissions using the same control channel and a set of resources for joint transmission may result in throughput gains, lower latency communication, and a more efficient use of channel resources.

A method for wireless communication at a UE is described. The method may include transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission, transmitting a first data packet over the first spatial layer of the sidelink transmission from a first TRP using the set of resources and based on the indication of spatial domain multiplexing, and transmitting a second data packet over the second spatial layer of the sidelink transmission from a second TRP using the set of resources and based on the indication of spatial domain multiplexing.

An apparatus for wireless communication at a UE is described. The apparatus may include a processor, memory in electronic communication with the processor, and instructions stored in the memory. The instructions may be executable by the processor to cause the apparatus to transmit sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission, transmit a first data packet over the first spatial layer of the sidelink transmission from a first TRP using the set of resources and based on the indication of spatial domain multiplexing, and transmit a second data packet over the second spatial layer of the sidelink transmission from a second TRP using the set of resources and based on the indication of spatial domain multiplexing.

Another apparatus for wireless communication at a UE is described. The apparatus may include means for transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission, means for transmitting a first data packet over the first spatial layer of the sidelink transmission from a first TRP using the set of resources and based on the indication of spatial domain multiplexing, and means for transmitting a second data packet over the second spatial layer of the sidelink transmission from a second TRP using the set of resources and based on the indication of spatial domain multiplexing.

A non-transitory computer-readable medium storing code for wireless communication at a UE is described. The code may include instructions executable by a processor to transmit sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission, transmit a first data packet over the first spatial layer of the sidelink transmission from a first TRP using the set of resources and based on the indication of spatial domain multiplexing, and transmit a second data packet over the second spatial layer of the sidelink transmission from a second TRP using the set of resources and based on the indication of spatial domain multiplexing.

Some examples of the method, apparatuses, and non-transitory computer-readable medium described herein may further include operations, features, means, or instructions for assigning a first hybrid automatic repeat request (HARQ) process identifier to the first spatial layer and a second HARQ process identifier to the second spatial layer, where the indication of spatial domain multiplexing includes an indication of the first HARQ process identifier for the first spatial layer and an indication of the second HARQ process identifier for the second spatial layer.

In some examples of the method, apparatuses, and non-transitory computer-readable medium described herein, the indication of spatial domain multiplexing includes a use of a shared first stage of the sidelink control information and separate second stages of the sidelink control information for the first spatial layer and the second spatial layer.

Some examples of the method, apparatuses, and non-transitory computer-readable medium described herein may further include operations, features, means, or instructions for assigning a common modulation and coding scheme to the first spatial layer and the second spatial layer, where a shared first stage of the sidelink control information signals the common modulation and coding scheme.

Some examples of the method, apparatuses, and non-transitory computer-readable medium described herein may further include operations, features, means, or instructions for assigning the common modulation and coding scheme may be based on a size of the first data packet and a size the second data packet with respect to the set of resources.

In some examples of the method, apparatuses, and non-transitory computer-readable medium described herein, the common modulation and coding scheme corresponds to a subchannel size available for the sidelink transmission.

Some examples of the method, apparatuses, and non-transitory computer-readable medium described herein may further include operations, features, means, or instructions for assigning separate modulation and coding schemes to the first spatial layer and the second spatial layer for decoding respectively the first data packet and the second data packet, where the sidelink control information signals the separate modulation and coding schemes.

In some examples of the method, apparatuses, and non-transitory computer-readable medium described herein, transmitting the sidelink control information may include operations, features, means, or instructions for transmitting a shared first stage of the sidelink control information indicating the separate modulation and coding schemes for the first spatial layer and the second spatial layer.

In some examples of the method, apparatuses, and non-transitory computer-readable medium described herein, transmitting the sidelink control information may include operations, features, means, or instructions for transmitting separate second stages of the sidelink control information for the first spatial layer and the second spatial layer using the respective separate modulation and coding schemes.

In some examples of the method, apparatuses, and non-transitory computer-readable medium described herein, transmitting the sidelink control information may include operations, features, means, or instructions for transmitting a shared first stage of the sidelink control information indicating a common modulation and coding scheme for decoding respective separate second stages of the first spatial layer and the second spatial layer and transmitting the respective separate second stages of the sidelink control information using the common modulation and coding scheme, where the second stage of the sidelink control information for the first spatial layer indicates one of the separate modulation and coding schemes for decoding the first data packet, and where the second stage of the sidelink control information for the second spatial layer indicates one of the separate modulation and coding schemes for decoding the second data packet.

Some examples of the method, apparatuses, and non-transitory computer-readable medium described herein may further include operations, features, means, or instructions for assigning the separate modulation and coding schemes may be based on a size of the first data packet and a size the second data packet with respect to the set of resources.

Some examples of the method, apparatuses, and non-transitory computer-readable medium described herein may further include operations, features, means, or instructions for assigning different demodulation reference signal ports to the first spatial layer of and the second spatial layer, where the sidelink control information signals the different demodulation reference signal ports.

In some examples of the method, apparatuses, and non-transitory computer-readable medium described herein, the sidelink control information signals a shared reservation priority of the first spatial layer and the second spatial layer.

In some examples of the method, apparatuses, and non-transitory computer-readable medium described herein, the sidelink control information signals a respective reservation priority of each of the first spatial layer and the second spatial layer.

Some examples of the method, apparatuses, and non-transitory computer-readable medium described herein may further include operations, features, means, or instructions for assigning separate destination identifiers to the first spatial layer and the second spatial layer, where the sidelink control information signals the separate destination identifiers.

Some examples of the method, apparatuses, and non-transitory computer-readable medium described herein may further include operations, features, means, or instructions for assigning separate cast types to the first spatial layer and the second spatial layer, where the sidelink control information signals the separate cast types.

Some examples of the method, apparatuses, and non-transitory computer-readable medium described herein may further include operations, features, means, or instructions for assigning separate new data indicators to the first spatial layer and the second spatial layer, where the sidelink control information signals the separate new data indicators.

Some examples of the method, apparatuses, and non-transitory computer-readable medium described herein may further include operations, features, means, or instructions for assigning separate communication range indicators to the first spatial layer and the second spatial layer, where the sidelink control information includes the separate communication range indicators.

Some examples of the method, apparatuses, and non-transitory computer-readable medium described herein may further include operations, features, means, or instructions for determining the set of resources for the sidelink transmission based on a measured signal strength associated with each of the first TRP and the second TRP.

In some examples of the method, apparatuses, and non-transitory computer-readable medium described herein, the set of resources includes a same transmission time interval for the first TRP and the second TRP.

In some examples of the method, apparatuses, and non-transitory computer-readable medium described herein, determining the set of resources may include operations, features, means, or instructions for selecting a reservation size of the set of resources based on a larger one of the first data packet or the second data packet.

In some examples of the method, apparatuses, and non-transitory computer-readable medium described herein, determining the set of resources may include operations, features, means, or instructions for adjusting a resource exclusion signal strength threshold to enable transmission of the first spatial stream at the first TRP and the second spatial stream at the second TRP.

A method for wireless communication at a UE is described. The method may include receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission, receiving a first data packet over the first spatial layer of the sidelink transmission from a first TRP using the set of resources and based on the indication of spatial domain multiplexing, and receiving a second data packet over the second spatial layer of the sidelink transmission from a second TRP using the set of resources and based on the indication of spatial domain multiplexing.

An apparatus for wireless communication at a UE is described. The apparatus may include a processor, memory in electronic communication with the processor, and instructions stored in the memory. The instructions may be executable by the processor to cause the apparatus to receive sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission, receive a first data packet over the first spatial layer of the sidelink transmission from a first TRP using the set of resources and based on the indication of spatial domain multiplexing, and receive a second data packet over the second spatial layer of the sidelink transmission from a second TRP using the set of resources and based on the indication of spatial domain multiplexing.

Another apparatus for wireless communication at a UE is described. The apparatus may include means for receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission, means for receiving a first data packet over the first spatial layer of the sidelink transmission from a first TRP using the set of resources and based on the indication of spatial domain multiplexing, and means for receiving a second data packet over the second spatial layer of the sidelink transmission from a second TRP using the set of resources and based on the indication of spatial domain multiplexing.

A non-transitory computer-readable medium storing code for wireless communication at a UE is described. The code may include instructions executable by a processor to receive sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission, receive a first data packet over the first spatial layer of the sidelink transmission from a first TRP using the set of resources and based on the indication of spatial domain multiplexing, and receive a second data packet over the second spatial layer of the sidelink transmission from a second TRP using the set of resources and based on the indication of spatial domain multiplexing.

Some examples of the method, apparatuses, and non-transitory computer-readable medium described herein may further include operations, features, means, or instructions for assigning a first HARQ process identifier to the first spatial layer and a second HARQ process identifier to the second spatial layer, where the indication of spatial domain multiplexing includes an indication of the first HARQ process identifier for the first spatial layer and an indication of the second HARQ process identifier for the second spatial layer.

In some examples of the method, apparatuses, and non-transitory computer-readable medium described herein, the indication of spatial domain multiplexing includes a use of a shared first stage of the sidelink control information and separate second stages of the sidelink control information for the first spatial layer and the second spatial layer.

In some examples of the method, apparatuses, and non-transitory computer-readable medium described herein, receiving the sidelink control information may include operations, features, means, or instructions for determining a common modulation and coding scheme to the first spatial layer and the second spatial layer, where the sidelink control information signals the common modulation and coding scheme.

In some examples of the method, apparatuses, and non-transitory computer-readable medium described herein, receiving the sidelink control information may include operations, features, means, or instructions for determining separate modulation and coding schemes to the first spatial layer and the second spatial layer, where the sidelink control information signals the separate modulation and coding schemes.

In some examples of the method, apparatuses, and non-transitory computer-readable medium described herein, receiving the sidelink control information may include operations, features, means, or instructions for determining different demodulation reference signal ports to the first spatial layer of and the second spatial layer, where the sidelink control information signals the different demodulation reference signal ports.

In some examples of the method, apparatuses, and non-transitory computer-readable medium described herein, the sidelink control information signals a shared reservation priority of the first spatial layer and the second spatial layer.

In some examples of the method, apparatuses, and non-transitory computer-readable medium described herein, the sidelink control information signals a respective reservation priority of each of the first spatial layer and the second spatial layer.

In some examples of the method, apparatuses, and non-transitory computer-readable medium described herein, receiving the sidelink control information may include operations, features, means, or instructions for determining respective destination identifiers for the first spatial layer and the second spatial layer, where the sidelink control information signals the separate destination identifiers.

In some examples of the method, apparatuses, and non-transitory computer-readable medium described herein, receiving the sidelink control information may include operations, features, means, or instructions for determining respective cast types of the first spatial layer and the second spatial layer, where the sidelink control information signals the respective cast types.

In some examples of the method, apparatuses, and non-transitory computer-readable medium described herein, receiving the sidelink control information may include operations, features, means, or instructions for receiving new data indicators to the first spatial layer and the second spatial layer, where the sidelink control information signals the separate new data indicators.

Some examples of the method, apparatuses, and non-transitory computer-readable medium described herein may further include operations, features, means, or instructions for assigning separate communication range indicators to the first spatial layer and the second spatial layer, where the sidelink control information includes the separate communication range indicators.

BRIEF DESCRIPTION OF THE DRAWINGS

FIGS. 10 through 13 show flowcharts illustrating methods that support control information for sidelink spatial domain multiplexing from multiple TRPs in accordance with aspects of the present disclosure.

DETAILED DESCRIPTION

Figure 1:
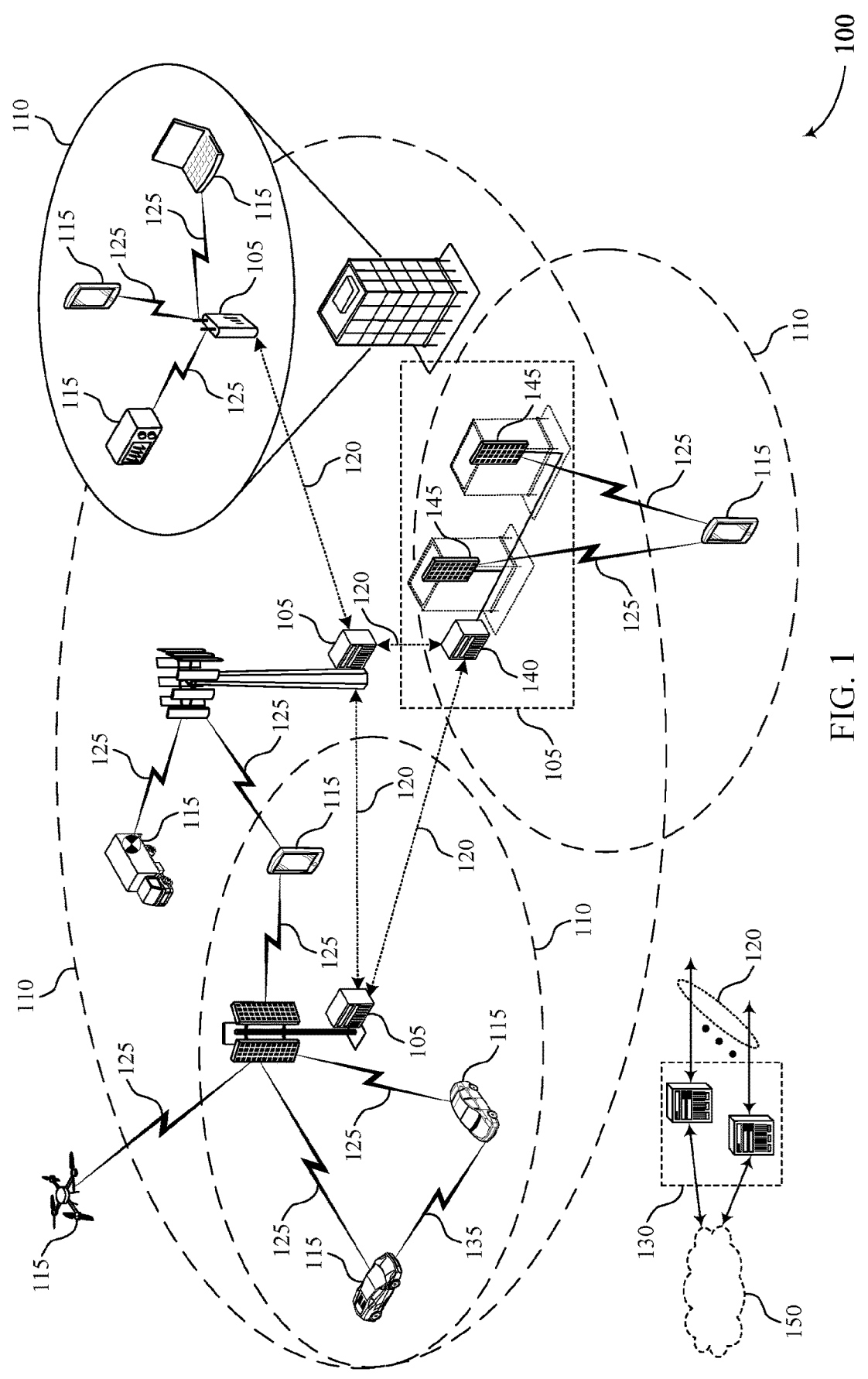
FIG. 1 illustrates an example of a wireless communications system that supports control information for sidelink spatial domain multiplexing from multiple transmission reception points (TRPs) in accordance with aspects of the present disclosure.

In some examples, wireless communications systems (e.g., vehicle-to-everything (V2X) systems) may support one or more user equipment (UEs) (e.g., UEs associated with vehicles) equipped with two or more transmission reception points (TRPs). Such UEs may communicate with one another using sidelink communications. TRPs on the same vehicle may be separated by a distance, which may be constrained by the size of the vehicle. For example, a first TRP may be located at the front of a vehicle and a second TRP may be located at the back of the vehicle. Spatial separation of transmitting TRPs may introduce discrepancies in how the channel is viewed by the different receiving TRPs due to factors such as using a line of sight (LoS) channel vs a non-line of sight (NLoS) channel, blockages, or the like. Further, packets transmitted or received by each TRP may have different directional requirements. The directional requirements may be based on the directions of received transmissions, application directives, network configurations, or the like.

To overcome channel discrepancies and account for directional requirements of packets, a multi-TRP UE, such as a vehicle, may use spatial domain multiplexing (SDM) to simultaneously transmit or receive multiple data packets in a directional manner. For example, a multi-TRP UE may use SDM to simultaneously transmit two or more data packets using two or more TRPs. In preparing an SDM transmission, the multi-TRP UE may signal the simultaneous transmission with a common control channel and determine resources for the data packets. In some cases, the data packets may be transmitted over the same or an overlapping set of frequency resources. The data packets may be transmitted during the same transmission time interval (TTI). The data packets may include the same information (e.g., have the same payload) or may be different. In some cases, the multi-TRP UE may map the simultaneous SDM transmissions to different spatial layers and determine a common control information message, such as a sidelink control information (SCI) message. The multi-TRP UE may map the SDM transmissions to two (or more) spatial layers. For example, the multi-TRP UE may map a first transmission to spatial layer 1 and a second transmission to spatial layer 2. The mapped transmissions may correspond to different application data, destinations, etc. In some examples, in the common SCI message, the multi-TRP UE may include an indication of whether the two transmissions are mapped to the same or different layers.

In some other examples, the multi-TRP UE may assign the data packets a common stage-1 control (SCI-1) message and separate stage-2 control (SCI-2) messages. The SCI-1 and SCI-2 messages may each include indications of parameters for one or both data packets. For instance, the SCI-1 may indicate whether multiple MCS may be used for the different spatial layers. When multiple MCS may be used, the multi-TRP UE may encode each of the transmissions separately and provide a list of MCS in the SCI-2 for respective decoding of each spatial layer. Additionally, or alternatively, the multi-TRP UE may indicate a different HARQ process identifier for each spatial layer, an indication of a priority of each data packet, a DMRS port indication, a transmission destination identifier, or the like.

In some examples, the multi-TRP UE may indicate a priority for each spatial layer. In some cases, the multi-TRP UE may use SCI to reserve future resources for an upcoming transmission. In such cases, the priority indication may also affect the reserved future resources. That is, the multi-TRP UE may indicate a highest priority of the spatial layers in the SCI-1, where future reservations may be excluded based on the highest indicated priority. For example, if a first data packet has a priority 1 and a second data packet has a priority 2 (e.g., a priority lower than priority 1), the multi-TRP UE may indicate a priority 1 in the SCI-1, and future resources may be excluded according to the priority 1. Alternatively, the multi-TRP UE may indicate the highest priority between the data packets in the SCI-1, but future reservations may be configured by individual priority. For example, each future reservation may have an additional field including priority. The exclusion or preemption of each future resource may be assessed on a packet-by-packet basis.

A receiving UE may determine if the receiving UE should decode one or both of the SDM transmissions. The common control information (e.g., SCI-1) may be used, by receiving UEs, to decode one or all of the multiplexed data packets. Determining whether the UE should decode the transmissions may be based on identifying the HARQ process IDs and the source and destination IDs as provided in the common control message. If the receiving UE identifies a HARQ process ID, source ID, or destination ID with which it is associated, it may decode the transmission corresponding to that ID. The receiving UE may ignore all transmissions specified by a source or destination ID that does not correspond to the receiving UE.

Simultaneous SDM transmissions using the same control channel and a set of resources for joint transmission may result in throughput gains, lower latency communication, and a more efficient use of channel resources.

Aspects of the disclosure are initially described in the context of wireless communications systems. Aspects of the disclosure are then illustrated by communications schemes and a process flow. Aspects of the disclosure are further illustrated by and described with reference to apparatus diagrams, system diagrams, and flowcharts that relate to control information for sidelink spatial domain multiplexing from multiple transmission reception points (TRPs).

FIG. 1 illustrates an example of a wireless communications system 100 that supports control information for sidelink spatial domain multiplexing from multiple transmission reception points (TRPs) in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) or sidelink communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the sidelink communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 in the wireless communications system 100 may have multiple TRPs that are spatially separated. The multi-TRP UE 115 may use spatial domain multiplexing (SDM) to transmit or receive multiple sidelink data packets (e.g., over sidelink communication link 135) simultaneously from two or more TRPs. The multi-TRP UE 115 may map each of the data packets to a different spatial layer, and may determine overlapping resources for transmitting both data packets. The multi-TRP UE may transmit sidelink control information (SCI) to the other UEs. In some cases, the SCI may be common for both data packets. In other cases, multi-TRP UE may transmit a common SCI and a separate SCI for each data packet. In any case, the SCI may include common and separate parameters for each spatial layer and/or data packet.

Figure 2:
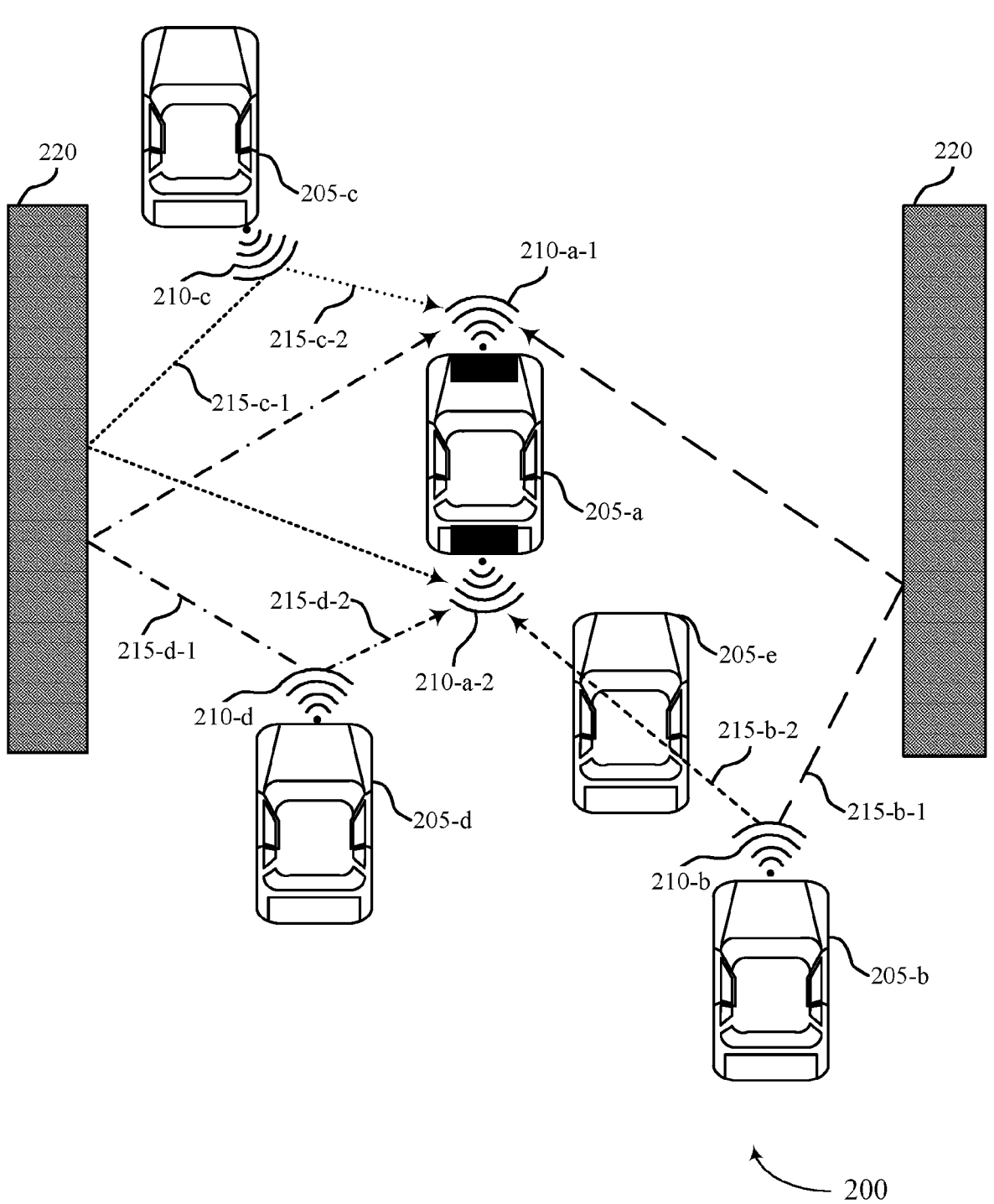
FIG. 2 illustrates an example of a wireless communications system that supports control information for sidelink spatial domain multiplexing from multiple TRPs in accordance with aspects of the present disclosure.

FIG. 2 illustrates an example of a wireless communications system 200 that supports control information for sidelink spatial domain multiplexing from multiple TRPs in accordance with aspects of the present disclosure. In some examples, the wireless communications system 200 may implement aspects of wireless communications system 100. The wireless communications system 200 may include a number of UEs 205, which may be examples of UEs 115 described with reference to FIG. 1. As illustrated in FIG. 2, the UEs 205 may be examples of vehicles.

Wireless communications system 200 may include UE 205-a, 205-b, UE 205-c, UE 205-d, and UE 205-e. In some examples, the UEs 205 may communicate with each other (e.g., within a V2X system, a D2D system, and the like) and may employ sidelink transmissions to save power, reduce latency, and ensure reliable communications. For example, wireless communications system 200 may support V2X communications between UE 205-a and UE 205-b, UE 205-c, and UE 205-d, and the V2X communications may include sidelink communications.

Although access links are not depicted in the example of FIG. 2, it may be understood that the wireless communications system 200 may support both access links and sidelinks for communications between one or more communication devices. An access link may refer to a communication link between a UE (such as UE 205-a, UE 205-b, UE 205-c, or UE 205-d) and a base station. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

UE 205-a may be a multi-TRP UE that includes TRP 210-a-1 and TRP 210-a-2. In some aspects, each of the TRPs 210-a-1 and 210-a-2 may be configured to receive and transmit signals. The TRPs 210-a-1 and 210-a-2 may be configured to transmit signals in conjunction with one another, individually (e.g., separately from one another), or both. In this regard, the TRPs 210 may include, but are not limited to, antennas, antenna panels, and the like. In some examples, a device supporting sidelink communications (e.g., a car) may include a front antenna panel and a rear antenna panel. Subsequently, larger vehicles (such as trucks and trailers) may include multiple TRPs. In such cases, each TRP of a multi-TRP UE may be associated with one or more TCI states, and the TCI state may be indicated in transmissions from the TRP.

In some cases, the TRPs 210 of UE 205-a may be positioned proximate (e.g., close) to one another. In other cases, the TRPs 210 of UE 205-a may be physically separated from each other by some distance. For example, TRP 210-a-1 may be positioned near the front of the vehicle, and TRP 210-a-2 may be positioned at or near the rear of the vehicle. In this example, TRP 210-a-1 (e.g., including a first antenna panel) and TRP 210-a-2 (e.g., including a second antenna panel) may be separated from one another by several meters. This physical separation may be even larger in the case of larger vehicles, such as semi-trucks, in which the multiple TRPs 210 of UE 205-a may be physically separated from one another by twenty meters or more.

TRPs 210 on the same vehicle may be different radio frequency (RF) modules with shared hardware, a shared software controller, or a combination of both. TRPs 210 on the same vehicle may view the communication channel differently due to the TRP separation. Spatial separation of the TRPs may introduce discrepancies in how the channel is viewed by the different TRPs due to factors such as using a line of sight (LoS) channel vs a non-line of sight (NLoS) channel, blockages, or the like. A LoS channel may vary from a NLoS channel. A first vehicle may use a LoS channel to transmit a message directly to a second vehicle. In the example of FIG. 2, UE 205-d uses an LoS channel to transmit from TRP 210-d to TRP 210-a-2 of UE 205-a via communication link 210-d-2. Alternatively, the first vehicle may use a NLoS channel which may depend on reflections from surrounding objects to transmit a signal to the second vehicle. As illustrated, UE 205-d uses an NLoS channel to transmit from TRP 210-d to TRP 210-a-1 of UE 205-a via communication link 215-d-1. This NLoS channel relies on communication link 215-d-1 to reflect off of an object 220 to complete the transmission path.

In some cases, UE 205-b may use a NLoS channel rather than a LoS channel due to an obstruction (e.g., another vehicle) on the LoS channel. For example, as illustrated in FIG. 2, UE 205-b experiences an obstruction caused by UE 205-e in the path of LoS communication link 215-b-2. Thus, UE 205-b uses an NLoS channel to transmit from TRP 210-b to TRP 210-a-1 of UE 205-a via communication link 215-b-1, where the NLoS channel relies on reflection from an object 220 to reach TRP 210-a-1. In some examples, the NLoS channel may correspond to a different transmission path length than that of the LoS channel, resulting in propagation loss along the NLoS channel. Thus, UE 205-a may be able to counter channel discrepancies with spatial domain multiplexing (SDM). UE 205-a may be able to simultaneously transmit or receive multiple data packets directionally, resulting in more efficient and robust communications.

Additionally, or alternatively, UE 205-a may experience variation in channel conditions due to the spatial separation of the TRPs. For example, the TRP 210-a-1 may receive signals from UE 205-b via a communications link 215-b-1, and the TRP 210-a-2 may receive signals from UE 205-d via communications link 215-d-2. In this example, the signals received at the TRP 210-a-1 may travel a greater distance than the signals received at the TRP 210-a-2. The varying propagation distances may result in varying parameters (e.g., characteristics) associated with the signals received by the respective TRPs 210. For instance, due to the differences in propagation distances, the signals received at TRP 210-a-1 may exhibit a lower signal quality (e.g., lower reference signal received power, lower reference signal received quality, higher signal to noise ratio, higher signal to interference plus noise ratio) as compared to the signals received at TRP 210-a-2. Moreover, the signals received at TRP 210-a-1 may be received later in time than the signals received at TRP 210-a-2. These differences in signal parameters (e.g., reference signal received power, reference signal received quality, signal to noise ratio, signal to interference plus noise ratio, time of receipt) may result despite the fact that the respective signals were transmitted UE 205-b and UE 205-d at the same time and with the same transmit power.

In some cases, different TRPs 210 of UE 205-a may include different quantities of other wireless devices to which they are connected (e.g., more traffic in front of a vehicle may cause a front TRP 210 to have more wireless connections than a rear TRP 210). Moreover, radio conditions and physical obstructions may cause one TRP 210 to have a lower quality link quality than another TRP 210. In some cases, UE 205-a may send transmissions of the same packet from different TRPs 210. Each transmission may be associated with one or more transmission configuration indicator (TCI) states. UE 205-a may reserve transmission resources for future transmissions by signaling a sidelink control information. Multi-TRP sidelink communications may enhance coverage for the communications between UE 205-*a* and other UEs. Additionally, multiple TRPs 210 may improve reliability, coverage, and capacity performance through flexible deployment scenarios. More specifically, multiple TRPs 210 equipped in different parts of vehicles may improve reliability in safety and other high robustness desired applications. In some cases, from a transmission point of view, data coverage may be biased. For example, side coverage may not be importance for certain cases (e.g., TRPs located on the side of a vehicle may not provide much value), and front or back biased or 360-degree coverage around the vehicle may be dependent on a packet content or type. From a receiver point of view, the multiple TRPs 210 at the vehicles may desire for 360-degree coverage. As such, UE 205-*a* may use both TRPs 210 to receive packets from other UEs 205.

As shown, UE 205-*a* may include TRP 210-*a*-1 at the front of the vehicle and a TRP 210-*a*-2 at the rear of the vehicle. Accordingly, UE 205-*a* may receive packets from the UE 205-*b* and the UE 205-*c* via TRP 210-*a*-1 and may receive packets from the UE 205-*c* and the UE 205-*d* via TRP 210-*a*-2. With each TRP 210, UE 205-*a* may establish respective communication links with each transmitting UE 205. For example, UE 205-*a* may establish a first communication link 215-*b*-1 with UE 205-*b* via TRP 210-*a*-1 and TRP 210-*b*, a second communication link 215-*c*-2 with UE 205-*c* via TRP 210-*a*-1 and TRP 210-*c*, and a third communication link 215-*d*-1 with UE 205-*d* via TRP 210-*a*-1 and TRP 210-*d*. Similarly, UE 205-*a* may establish a fourth communication link 215-*c*-1 with UE 205-*c* via TRP 210-*a*-2 and TRP 210-*c*, and a fifth communication link 215-*d*-2 with UE 205-*d* via TRP 210-*a*-2 and TRP 210-*d*. As illustrated in FIG. 2, UE 205-*b* may attempt an additional communication link 215-*b*-2 with TRP 210-*a*-2 of UE 205-*a*, but the channel may be blocked by UE 205-*e*.

As described herein, to make effective use of sidelink resources (e.g., time and frequency resources allocated for sidelink communications), the UEs 205 may use spatial domain multiplexing (SDM) to transmit or receive simultaneous transmissions. For example, the UEs 205 may use SDM on transmissions with different directional requirements. In some cases, the UEs 205 may use SDM for directional retransmission of broadcast messages. For example, negative acknowledgements (NACKs) may be received by UE 205-*a* from a first direction for a first packet and NACKs may be received from a second direction for a second packet. UE 205-*a* may simultaneously retransmit the first data packet in the first direction and the second data packet in the second direction. In some cases, the UEs 205 may use SDM for directional transmissions as indicated by the application layer. For example, an application which generates a packet may require that the packet be sent in a particular direction. The directional requirement may be based on a network configuration or the like. As described herein, enhancement of control information and resource determination for sidelink communications may enable multi-TRP UEs to transmit and receive multiple packets simultaneously via SDM.

For example, UE 205-*a* may use SDM to simultaneously transmit, to UE 205-*d* via a sidelink communication link, two or more data packets of a sidelink transmission using both TRPs 210-*a*-1 and 210-*a*-2. Additionally, or alternatively, UE 205-*a* may use SDM to simultaneously transmit, a first data packet to UE 205-*c* via TRP 210-*a*-1 and a second data packet to UE 205-*d* via TRP 210-*a*-2. In either case, the data packets may be transmitted over the same or an overlapping set of time and frequency resources. To enable such SDM transmissions, UE 205-*a* may transmit sidelink control information (SCI) to UE 205-*c* and/or UE 205-*d*. The SCI may include an indication of SDM between first and second (or more) spatial layers of the sidelink transmission. Additionally, the SCI may indicate a set of resources to be used for the sidelink transmission. The set of resources may be determined based on signal strengths of each TRP, a size of one or more of the data packets, or other parameters. UE 205-*a* may thus transmit a first data packet of the two or more data packets over the first spatial layer from the TRP 210-*a*-1, and a second data packet of the two or more data packets over the second spatial layer from the TRP 210-*a*-2. In some examples, UE 205-*a* may also include (e.g., in the SDM indication, the SCI, etc.) an indication of a HARQ process identifier (ID) for each spatial layer.

In some examples, UE 205-*a* may transmit multiple stages of SCI to schedule simultaneous or overlapping data transmissions from TRP 210-*a*-1 and TRP 210-*a*-2. The SCI stages may include shared SCI (e.g., SCI associated with both data packets and/or spatial layers), separate SCI (e.g., a separate SCI associated with respective data packets and/or spatial layers), or both. For example, the UE 205-*a* may use a first stage of the SCI (e.g., SCI-1) to indicate SCI shared between both data packets and/or spatial layers and may use two second stages of the SCI (e.g., SCI-2) for each of the data packets and/or spatial layers, respectively. The shared SCI-1 may include an indication of a common MCS for both spatial layers, reservation priorities for both spatial layers, etc. The SCI-2 for each spatial layer may include, for each respective layer, a separate reservation priority, a separate MCS, a cast type, a destination identifier, a communication range indicator, or a DMRS port, among other examples.

A receiving UE (e.g., UE 205-*b*, UE 205-*c*, or UE 205-*d*) may use the SCI to determine if the receiving UE is to decode one or both of the SDM transmissions. The SCI may be used by receiving UEs to decode one or more of the spatially multiplexed data packets. Determining whether the receiving UE is to decode the transmissions may be based on identifying the HARQ process IDs and the source and destination IDs as provided in the SCI. For example, if the receiving UE identifies a HARQ process ID, source ID, or destination ID with which it is associated, it may decode the transmission corresponding to that ID. The receiving UE may ignore all transmissions specified by an ID that do not correspond to the receiving UE.

Figure 3:
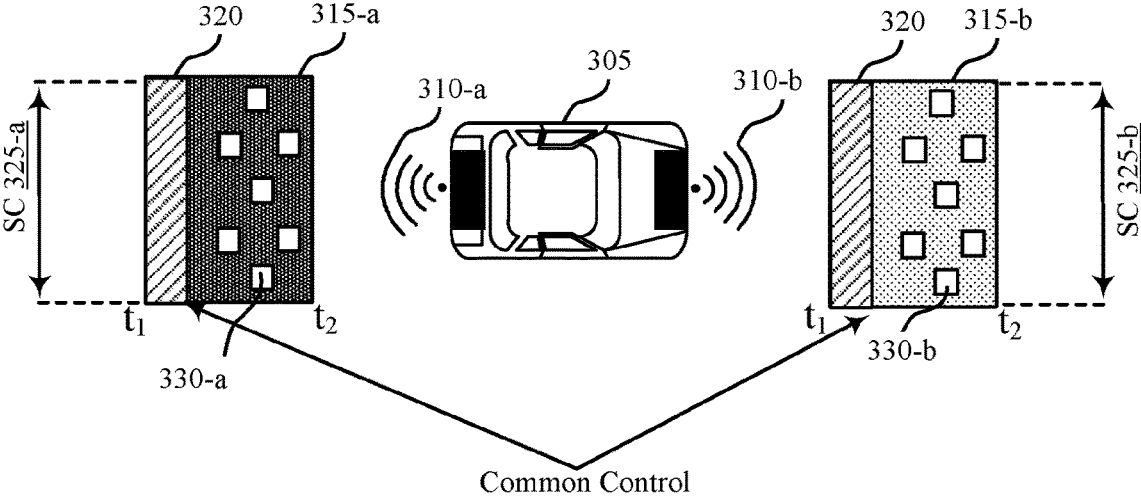
FIGS. 3 and 4 illustrate examples of communication schemes that support control information for sidelink spatial domain multiplexing from multiple TRPs in accordance with aspects of the present disclosure.

FIG. 3 illustrates an example of a communication scheme 300 that supports control information for sidelink spatial domain multiplexing from multiple TRPs in accordance with aspects of the present disclosure. In some examples, the communication scheme 300 may implement aspects of the wireless communications system 100 or the wireless communications system 200. The communication scheme 300 may include a UE 305 with multiple TRPs 310, which may be an example of a UE 115 or a UE 205 as described with reference to FIGS. 1 and 2.

The UE 305 may include a first TRP 305-*a* and a second TRP 305-*b* different from the first TRP 305-*a*. The TRPs 305-*a* and 305-*b* may be configured to transmit signals in conjunction with one another, individually (e.g., separately from one another), or both. In this regard, the TRPs 305 may include, but are not limited to, antennas, antenna panels, and the like. As depicted herein, the UE 305 may support techniques for sidelink SDM transmissions from multiple TRPs. In particular, a multi-TRP UE 305 may configure an SCI transmission to indicate SDM between two or more spatial layers of a sidelink transmission. In some examples, the sidelink control information transmission may also reserve resources for the sidelink transmission. In some examples, the sidelink control information transmission may include an indication of a set of resources for the sidelink transmission, as well as other parameters corresponding to one or more of the spatial layers.

As illustrated, the UE 305 may transmit a sidelink transmission including a common SCI 320, a first data packet 315-*a*, and a second data packet 315-*b*. Each data packet may be transmitted over a subchannel 325 and on a set of resources 330. For example, at time $t_1$, the UE 305 may transmit a common SCI 320 from both TRPs 310-*a* and 310-*b* over subchannels 325-*a* and 325-*b*, respectively. The UE 305 may transmit a first data packet 315-*a* over subchannel 325-*a* from TRP 310-*a* using resource set 330-*a*. Simultaneously, the UE 305 may transmit a second data packet 315-*b* over subchannel 325-*b* from TRP 310-*b* using resource set 330-*b*. In some cases, the data packets 315 may be the same (e.g., may have the same payload), while in other cases, the data packets 315 may be different.

In preparing the SDM sidelink transmission, the UE 305 may determine the resources 330 and signal the simultaneous transmission and the determined resources with the common SCI 320. Each TRP 310 may maintain a separate resource map, and the UE 305 may consider each resource map to jointly select a TTI and the resources 330. The UE 305 may consider resource availability and timing deadlines when determining the resources 330. For example, the UE 305 may determine resources 330 that are available to be used for both data packets 315 and that support timing restrictions of each data packet 315. In some examples, the resources 330 may be selected such that they are on the same TTI and/or subframe. As illustrated in FIG. 3, the resources 330 are on the same TTI, as they are transmitted between time $t_1$ and time $t_2$.

The UE 305 may determine the resources 330 to account for size differences of each data packet 315. For example, if data packet 315-*a* has a larger size than data packet 315-*b*, the UE 305 may select resources that can accommodate packet 315-*a*. Additionally, or alternatively, the UE 305 may select the resources 330 according to an MCS of one or both of the data packets 315. For instance, data packet 315-*a* may be larger than data packet 315-*b*, and data packet 315-*a* may be encoded with a higher MCS. The UE 305 may increase the MCS (e.g., up to a threshold) of the data packet 315-*a* to fit the larger data packet 315-*a* within the available resources. However, if the UE 305 determines that increasing the MCS may not enable the data packet 315-*a* to fit within the available resources, the UE 305 may not perform SDM on the data packets 315.

The UE 305 may map the simultaneous SDM transmissions to different spatial layers. For example, the UE 305 may map the first data packet 315-*a* to a layer 1 and the second data packet 315-*b* to layer 2. The mapped transmissions may correspond to different application data, destinations, etc. In some examples, the UE 305 may select reference signals for each spatial layer such that the reference signals may be orthogonally decoded. In some examples, the data packets 315 may be transmitted as ranked transmissions.

In some examples, in the common SCI 320, the UE 305 may include an indication of the SDM between the spatial layers. In some cases, the indication of the SDM between the spatial layers may be implicit from the use of a shared first stage of the SCI (e.g., SCI-1) for the spatial layers and separate second stages of the SCI (e.g., SCI-2) for separate spatial layers. In such cases, the SCI-1 and SCI-2 may each carry information for both data packets 315, and the information may apply to both data packets 315 or separately to each respective data packet 315. For example, the SCI-1 may include information shared between both spatial layers, and a first SCI-2 may include information for the first spatial layer and a second SCI-2 may include information for the second spatial layer. In some cases, the SCI-2 may indicate the rank of a data packet 315 associated with the corresponding spatial layer. In some cases, the SCI-2 may indicate whether the two SDM transmissions are mapped to the same data packet 315 or to different data packets 315. For instance, the UE 305 may assign a HARQ process ID to each spatial layer, and the SCI-2 for each spatial layer may include an indication of the corresponding HARQ process ID.

The UE 305 may determine an MCS for each of the spatial layers used to transmit the data packets 315. In some examples, the UE 305 may assign an MCS separately to each spatial layer, while in other examples, the UE 305 may assign a common MCS shared between both spatial layers. In any case, the MCS for the spatial layer may be used to decode the data packet 315 mapped to the corresponding spatial layer. The MCS for each layer may be indicated in the SCI-1, SCI-2, or both. For instance, if the MCS is shared (e.g., common) for both spatial layers (e.g., and both corresponding data packets 315-*a* and 315-*b*), the UE 305 may indicate the common MCS in the SCI-1. Alternatively, if each spatial layer (e.g., and each data packet 315) is assigned a separate MCS, the UE 305 may indicate each separate MCS in the SCI-1. As another example, the UE 305 may transmit separate SCI-2 for each respective spatial layer using the assigned respective MCS. Alternatively, the UE 305 may transmit an indication of a common MCS in SCI-1, where the common MCS is to be used to transmit and decode the respective separate SCI-2, but each SCI-2 may further indicate a separate (e.g., different from the common) MCS for each corresponding data packet 315.

The UE 305 may determine an appropriate MCS based on the size of each data packet 315 (e.g., with respect to the set of determined resources 330) or the size of the subchannel 325 that is available for the SDM transmission. For example, if the UE 305 determines that sufficient resources are available, the UE 305 may select the lowest MCS associated with a data packet 315. If the UE 305 determines that there are not sufficient resources available, the UE 305 may select an MCS based on the subchannel 325 size. The UE 305 may select the reservation size of the SDM transmission such that the larger of the two data packets 315 may be accommodated. In some examples, when the SDM transmission may use multiple MCS, resources may be available that fit the smaller data packet 315, but not the larger data packet 315. In this case, the UE 305 may encode the larger data packet 315 with a higher MCS and may indicate the respective MCS (e.g., in the SCI-2). In some examples, the UE 305 may determine that a first data packet 315 is to be transmitted on a first TRP 310 (e.g., TRP 310-*a*). The UE 305 may increase the resource exclusion reference signal received power (RSRP) threshold until a preconfigured limit such that a second data packet 315 may be transmitted on a second TRP 310 (e.g., TRP 310-*b*). The preconfigured limit may be set to mitigate transmission interference. If the UE 305 determines the two data packet 315 cannot be spatially multiplexed based on the RSRP measurements, the UE 305 may transmit the packets separately.

In some examples, in the common SCI 320 (e.g., SCI-1), the UE 305 may include a one or multi-bit DMRS port indication to indicate one or multiple ports corresponding to each spatial layer. For instance, the UE 305 may use a one bit DMRS and may limit the use of two ports over the TRPs 310. Alternatively, the UE 305 may use a multi-bit indication to indicate a DMRS port, such as a 3-bit indication (e.g., to signal 8 possible DMRS port combinations). The UE 305 may also indicate (e.g., in SCI-2) one or more DMRS ports corresponding to each TRP.

The UE 305 may include an indication of a priority level for each of the data packets 315. Each data packet 315 may have a different or same priority level. In some examples, the UE 305 may perform an SDM transmission on data packets 315 of the same priority level. In other cases, if the data packets 315 each have different priority levels, the UE 305 may include (e.g., in SCI-1) an indication of the highest priority level of the data packets 315. For instance, if the data packet 315-$a$ has a priority level of 1 (e.g., a higher priority level) and the data packet 315-$b$ has a priority level of 0 (e.g., a lower priority level), the common SCI 320 (e.g., SCI-1) may indicate that the SDM transmission has a priority level of 1. In some other cases, the UE 305 may indicate (e.g., in SCI-1) the respective priority level for each data packet 315.

In some cases, an SCI (e.g., a common SCI 320) may include resource information for the current data packet (e.g., a data packet 315) as well as resource reservation information for a future transmission, such as a retransmission of the current data packet. In such cases, the UE 305 may include resource reservation information according to the priority level. For instance, at a later time (e.g., after time $t_2$), the data packets 315 may be retransmitted using SDM. The SCI-1 included in the common SCI 320 transmitted at time $t_1$ may include a resource reservation for the future retransmission and an indication of the highest available priority of the data packets 315. Alternatively, if the data packets 315 are to be individually (e.g., not using SDM) retransmitted at a later time (e.g., after time $t_2$), the SCI-1 included in the common SCI 320 may include a resource reservation for a retransmission of each individual data packet 315 as well as an indication of the priority associated with each data packet 315.

In some examples, in the common SCI 320 (e.g., SCI-1), the UE 305 may indicate a transmission destination ID for each spatial layer. For example, when using unicast or a mix of unicast, broadcast, or groupcast links, the UE 305 may include a list of destination IDs associated with each spatial layer. Additionally or alternatively, the UE 305 may include an indication (e.g., in SCI-2 of one or more values) of a cast type for each data packet 315. The cast type may indicate whether a data packet 315-$a$ is a broadcast transmission, a unicast transmission, a groupcast transmission, or some combination thereof. For example, the common SCI 320 may include a groupcast cast type indication for data packet 315-$a$ that indicates that data packet 315-$a$ is for a group to which a receiving UE does not belong, the receiving UE may choose to refrain from decoding the data packet 315-$a$. In some examples, if a data packet 315 is not a retransmission, the UE 305 may include (e.g., in the SCI-2) a new data indicator (e.g., a set of new data indicator bits) associated with the corresponding spatial layer. In some examples, the UE 305 may signal a set of one or more communication ranges for each data packet 315, such that the range of a given transmission channel must satisfy a threshold value for each data packet 315 to be transmitted. For instance, if the SDM transmission includes a mix of broadcast and groupcast transmissions, the groupcast transmissions may have a communication range requirement but the broadcast transmissions may not.

A receiver UE may receive the common SCI 320 associated with the SDM transmission over a sidelink channel. The common control information may be used by receiving UEs to decode one or all of the multiplexed data packets 315. Determining whether the receiving UE should decode the transmissions may be based on identifying the HARQ process ID, the destination IDs, the communication range indicators, and the cast type as provided in the common SCI 320. If a receiving UE identifies a HARQ process ID, destination ID, or other parameter with which it is associated, it may decode the data packet 315 corresponding to that ID. The receiving UE may ignore all transmissions specified by an ID that do not correspond to the receiving UE.

Figure 4A:
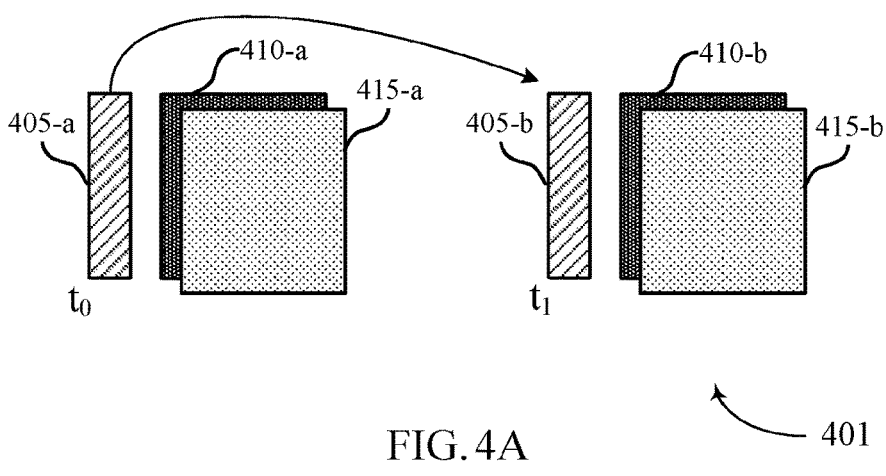
Figure 4B:
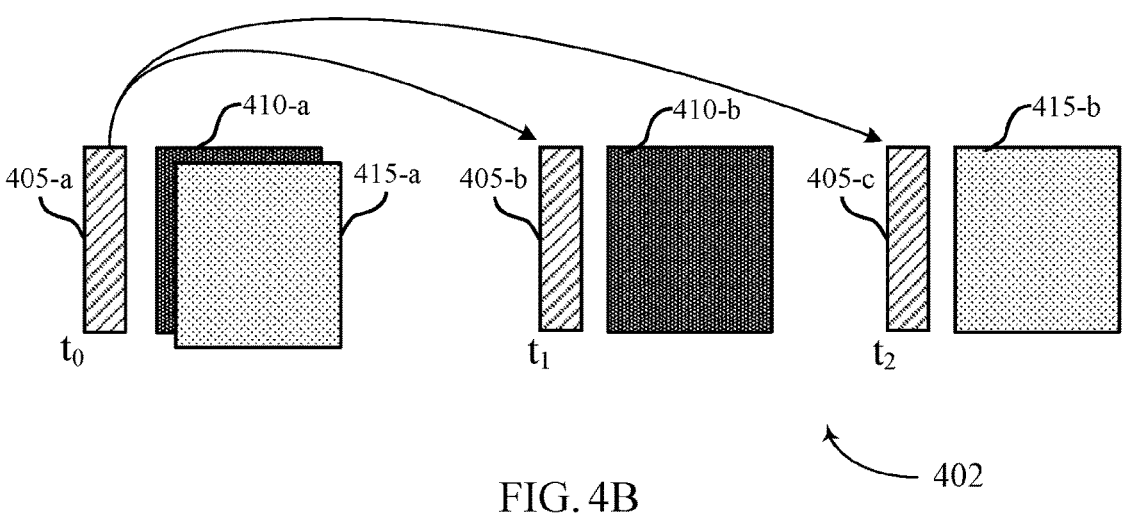
Figure 4C:
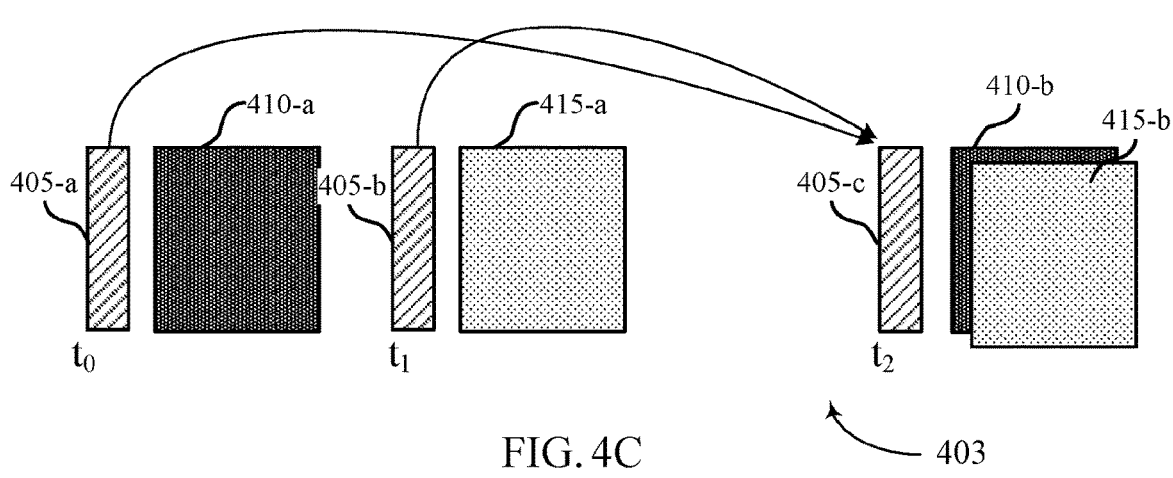

FIGS. 4A through 4C illustrate examples of communications schemes that supports control information for sidelink spatial domain multiplexing from multiple TRPs in accordance with aspects of the present disclosure. In some examples, the communications schemes 401, 402, and 403 may implement aspects of the wireless communications systems 100, 200, or 300. For example, the communications schemes 401, 402, and 403 may be examples of communications schemes used to transmit SDM sidelink transmissions between multi-TRP UEs as described in FIGS. 2 and 3.

As described herein, a multi-TRP UE may use SDM for sidelink communications to simultaneously transmit or receive SCI and two or more data packets. In some examples of sidelink communications, a TRP may reserve resources for upcoming transmissions via SCI. For example, a transmitter UE may include one or more SCI to reserve resources for future retransmissions along with the SCI for a current packet (to be used by a receiver to decode the packet). A receiver UE may determine that the SCI reserves time and frequency resources for a future sidelink data transmission. In some cases, the transmitting UE may reserve resources for SDM re-transmissions of a previously SDM-transmitted set of data packets. In some examples, the transmitting UE may reserve future resources for individual data packets being transmitted (e.g., if SDM transmission is not possible for re-transmission). In some examples, the transmitting UE may reserve future resources for two non-SDM transmissions if SDM is possible at a later time.

FIG. 4A includes an SCI 405-$a$ and two data packets 410-$a$ and 415-$a$ that may be transmitted using SDM. For example, as described herein, a multi-TRP UE may determine that packets 410-$a$ and 415-$a$ may be transmitted using SDM from two TRPs of the multi-TRP UE. The SCI 405-$a$ may be transmitted at a time to and may include a reservation indication to reserve resources for a future transmission. As illustrated, the SCI 405-$a$ may reserve resources for a second SCI 405-$b$ transmission and a second set of packets 410-$b$ and 415-$b$ that may be transmitted at a time $t_1$. Each time to and $t_1$ may be examples of start times for a transmission time interval TTI. The SCI 405-$a$ may thus indicate a reservation for a future set of SDM transmissions.

FIG. 4B includes an SCI 405-$a$ and two data packets 410-$a$ and 415-$a$ that may be transmitted using SDM from two TRPs of the multi-TRP UE. The SCI 405-$a$ may be transmitted at a TTI starting at time to and may include a reservation indication to reserve resources for a future transmission. In contrast to FIG. 4A, the SCI 405-$a$ in FIG. 4B may include reservations for packets 410-$b$ and 415-$b$ that may be transmitted individually at a time $t_1$ and a time $t_2$, respectively. Each future packet 410-$b$ and 415-$b$ may have a corresponding SCI 405-$b$ and 405-$c$, respectively. In the example of FIG. 4B, the multi-TRP UE may use SDM to transmit the first instance of SCI 405-*a* and the packets 410-*a* and 415-*a*, but may determine that a future retransmission of the packets 410-*a* and 415-*a* may not be able to utilize SDM. For example, the UE may determine that at time to, data packet 410-*a* and data packet 415-*a* may each have different directional requirements and may be candidates for an SDM transmission. However, based on sensing information, the UE may determine that retransmitting data packets 410 and 415 simultaneously may result in performance degradation (e.g., due to network congestion, increased interference, delay constraints, etc.) Thus, the UE may use the SCI 405-*a* to reserve resources for future individual retransmissions of the data packets 410 and 415. The UE may transmit a retransmission of data packet 410 (e.g., data packet 410-*b*) with an SCI 405-*b* at time $t_1$ and may transmit a retransmission of data packet 415 (e.g., data packet 415-*b*) with an SCI 405-*c* at time $t_2$ based on the resource reservation indicated in the SCI 405-*a*.

FIG. 4C includes an SCI 405-*a* and a packet 410-*a* transmitted at a time to, and an SCI 405-*b* and a data packet 415-*a* transmitted at a time $t_1$. As illustrated, the SCI 405-*a* and 405-*b* may reserve resources for a future SDM transmission. For example, the UE may determine that the individual transmissions of the data packets 410 and 415 may be candidates for an SDM transmission at a time $t_2$. Thus, each individual SCI 405-*a* and 405-*b* may reserve the same resources for a single future SDM transmission that may include an SCI 405-*c* and an SDM transmission of data packets 410-*b* and 415-*b*.

Figure 5:
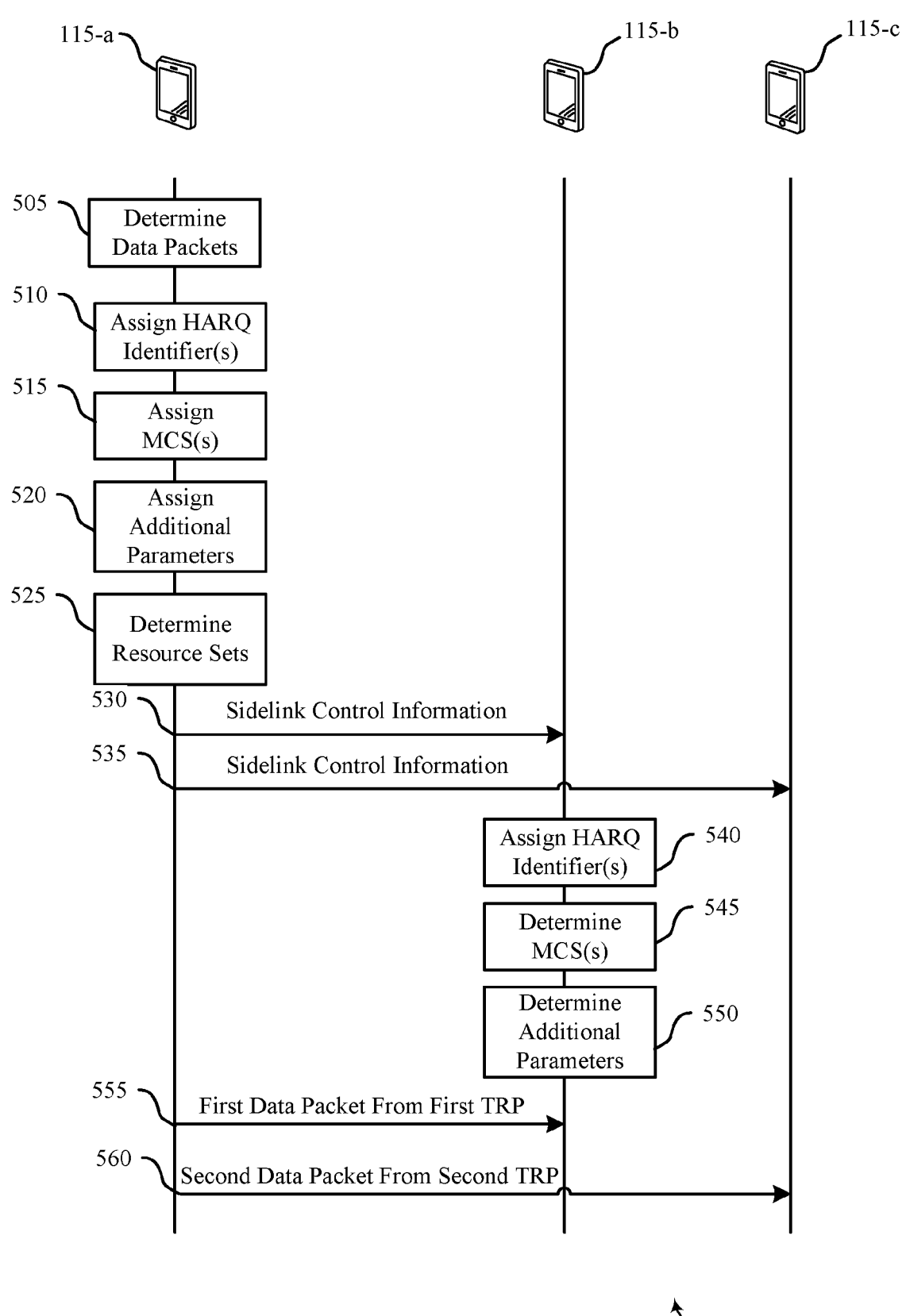
FIG. 5 illustrates an example of a process flow that supports control information for sidelink spatial domain multiplexing from multiple TRPs in accordance with aspects of the present disclosure.

FIG. 5 illustrates an example of a process flow 500 that supports control information for sidelink spatial domain multiplexing from multiple TRPs in accordance with aspects of the present disclosure. In some examples, the process flow 500 may implement aspects of wireless communications system 100 or 200, or any combination thereof. For example, the process flow 500 may illustrate a first UE 115-*a* that includes two or more TRPs transmitting, to a second UE 115-*b* and a third UE 115-*c*, common sidelink control information and one or more data packets using SDM.

In some cases, process flow 500 may include a first UE 115-*a*, a second UE 115-*b*, and a third UE 115-*c*, which may be examples of corresponding devices as described herein. The UEs 115 illustrated in FIG. 5 may be examples of the vehicle UEs 205 and 305 described with reference to FIGS. 2 and 3, respectively. In some aspects, the respective UEs 115 illustrated in FIG. 5 may communicate with one another via sidelink communications links, such as the communications links 215 illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the UE 115-*a* may determine two or more data packets that may be transmitted by two or more TRPs of the UE 115-*a* using SDM. The UE 115-*a* may determine that the data packets are candidates for a sidelink SDM transmission, e.g., the data packets may have different directional requirements. As an example, the UE 115-*a* may determine that the data packets are directional retransmissions (e.g., of broadcast transmissions) or are transmissions indicated to be directional by an application layer (e.g., where the application generating the packet has directional requirements). The UE 115-*a* may determine that a first TRP may be used to transmit a first data packet and a second TRP may be used to transmit as second data packet. In some examples, the data packets may include a same payload, while in other examples, each data packet may have a unique payload. The UE 115-*a* may assign each determined data packet to a spatial layer of a sidelink transmission. For example, a first data packet may be mapped to a first spatial layer of a sidelink transmission, and a second data packet may be mapped to a second spatial layer of the sidelink transmission.

At 510, the UE 115-*a* may assign a hybrid automatic repeat request (HARM) process identifier to each spatial layer.

At 515, the UE 115-*a* may assign a modulation and coding scheme (MCS) to each spatial layer. In some cases, the UE 115-*a* may assign a common MCS such that each spatial layer shares the same MCS. The common MCS may be assigned according to a size of each data packet (e.g., with respect to a set of determined resources for each packet). Additionally or alternatively, the common MCS may correspond to a subchannel size available for the sidelink transmission. In other cases, the UE 115-*a* may assign a separate MCS to each spatial layer such that each data packet corresponding to a spatial layer may be decoded with the respective MCS. For example, the UE 115-*a* may assign a first MCS to the first layer for the first data packet, and a second MCS to the second layer for the second data packet. In some examples, the separate MCSs may be assigned based on a size of each data packet (e.g., with respect to a set of determined resources for each packet).

At 520, the UE 115-*a* may assign additional parameters to one or more of the data packets and/or the corresponding spatial layers. Such additional parameters may include, but are not limited to, a demodulation reference signal (DMRS) port, a reservation priority, a destination identifier, a cast type, a new data indicator, a communication range indicator, or the like. For example, the UE 115-*a* may assign different DMRS ports to each spatial layer. Similarly, the UE 115-*a* may assign separate destination identifiers, cast types, new data indicators, and/or communication range indicators to the first spatial layer and the second spatial layer. Additionally or alternatively, the UE 115-*a* may determine and assign a reservation priority to each spatial layer separately, or may assign a shared reservation priority to both spatial layers.

At 525, the UE 115-*a* may determine a set of resources for the sidelink transmission. The set of resources may be determined based on a measured signal strength associated with each of the TRPs used to transmit the sidelink transmission. In some examples, the set of resources may comprise a same transmission time interval (TTI) for both the first and second TRP. The UE 115-*a* may select a reservation size of the set of resources based on the largest data packet. In some cases, the UE 115-*a* may adjust a resource exclusion signal strength threshold to enable transmission of the first spatial layer at the first TRP and the second spatial layer at the second TRP.

At 530, the UE 115-*a* may transmit SCI to the UE 115-*b*. At 535, the UE 115-*a* may transmit SCI to the UE 115-*c*. The SCI may include an indication that the first spatial layer and the second spatial layer of the sidelink transmission use SDM. In some cases, the SDM indication may include a first stage of the SCI (e.g., SCI-1) and one or more second stages of the SCI (e.g., SCI-2). For example, the SDM indication may include a shared SCI-1 for both spatial layers and a separate SCI-2 for each respective spatial layer.

The SDM indication and/or the SCI may further include one or more additional indications, such as indications of parameters assigned at any one of 510 through 520. The additional indications may be provided for each spatial layer separately, or may be shared between both spatial layers. For example, the SDM indication may include an indication of the first HARQ process identifier for the first spatial layer and an indication of the second HARQ process identifier for the second spatial layer. Additionally, or alternatively, the SCI may signal different DMRS ports, destination identifiers, cast types, new data indicators, communication range indicators, or other examples for each spatial layer. In some cases, the SCI may indicate a shared reservation priority for both spatial layers, or may indicate separate reservation priorities for each spatial layer.

In some examples, shared additional indications may be signaled by the shared first stage of the SCI, and separate additional indications may be signaled by the separate second stages of the SCI. For instance, if the UE 115-*a* determines, at 515, that the spatial layers may share a common MCS, the SCI-1 may indicate the common MCS. Alternatively, the UE 115-*a* determines that each spatial layer may be assigned a separate MCS, the SCI-2 for each respective spatial layer may indicate the corresponding assigned MCS. In still other examples, the UE 115-*a* may include separate additional indications for each spatial layer in the shared first stage of the SCI. For example, the SCI-1 may include an indication of the separate MCS for each of the first spatial layer and the second spatial layer.

In some cases, the SCI-2 for each respective spatial layer may be transmitted using the corresponding assigned MCS. Additionally, or alternatively, the UE 115-*a* may transmit a shared SCI-1 that includes an indication of a common MCS to be used for decoding separate SCI-2s, where the SCI-2s may be transmitted using the common MCS. In this case, each SCI-2 may further include an indication of a separate MCS for decoding each data packet. For example, an SCI-2 for the first spatial layer may include an indication of a first MCS to be used for decoding the first data packet, and an SCI-2 for the second spatial layer may include an indication of a second MCS to be used for decoding the second data packet.

At 540, the UE 115-*b* may assign a first HARQ process identifier to the first spatial layer (e.g., indicated in the SCI received at 530) and a second HARQ process identifier to the second spatial layer (e.g., indicated in the SCI received at 530). The HARQ process identifiers may be assigned by the UE 115-*b* based on the SDM indication received at 530.

At 545, the UE 115-*c* may assign a first HARQ process identifier to the first spatial layer (e.g., indicated in the SCI received at 535) and a second HARQ process identifier to the second spatial layer (e.g., indicated in the SCI received at 535). The HARQ process identifiers may be assigned by the UE 115-*c* based on the SDM indication received at 535.

At 550, the UE 115-*b* may determine an MCS for each spatial layer based on the indication(s) received in the SCI at 530. For example, based on the SCI, the UE 115-*b* may determine that both spatial layers may be decoded with a shared MCS, or that each spatial layer may be decoded with a separate respective MCS.

At 555, the UE 115-*c* may determine an MCS for each spatial layer based on the indication(s) received in the SCI at 535. For example, based on the SCI, the UE 115-*c* may determine that both spatial layers may be decoded with a shared MCS, or that each spatial layer may be decoded with a separate respective MCS.

At 560, the UE 115-*b* may determine additional parameters corresponding to each spatial layer. The additional parameters may be determined based on additional indication received at 530. For example, the UE 115-*b* may determine a DMRS port, a reservation priority, a destination identifier, a cast type, a new data indicator, a communication range indicator, or any other parameter for each of the spatial layers. In some examples, one or more parameters determined at 545 may be shared between both spatial layers.

At 565, the UE 115-*c* may determine additional parameters corresponding to each spatial layer. The additional parameters may be determined based on additional indication received at 535. For example, the UE 115-*c* may determine a DMRS port, a reservation priority, a destination identifier, a cast type, a new data indicator, a communication range indicator, or any other parameter for each of the spatial layers. In some examples, one or more parameters determined at 565 may be shared between both spatial layers.

At 570, the UE 115-*a* may transmit, and the UE 115-*b* may receive, the first data packet over the first spatial layer using the set of resources (e.g., determined at 525). The UE 115-*a* may transmit the first data packet over the first spatial layer from the first TRP using SDM.

At 575, the UE 115-*a* may transmit, and the UE 115-*c* may receive, the second data packet over the second spatial layer using the set of resources (e.g., determined at 525). The UE 115-*a* may transmit the second data packet over the second spatial layer from the second TRP using SDM.

Figure 6:
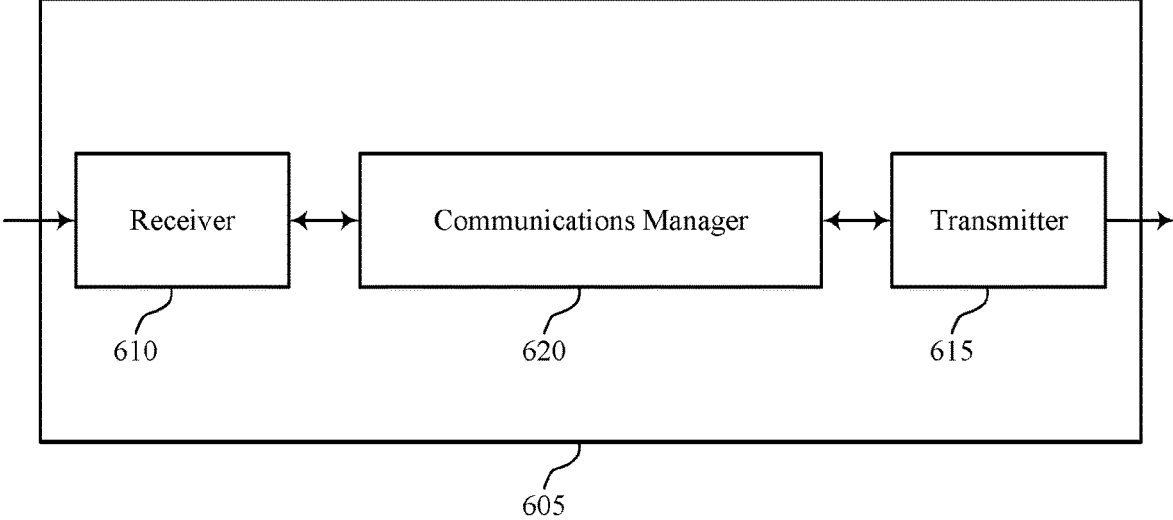
FIGS. 6 and 7 show block diagrams of devices that support control information for sidelink spatial domain multiplexing from multiple TRPs in accordance with aspects of the present disclosure.

FIG. 6 shows a block diagram 600 of a device 605 that supports control information for sidelink spatial domain multiplexing from multiple TRPs in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to control information for sidelink spatial domain multiplexing from multiple TRPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to control information for sidelink spatial domain multiplexing from multiple TRPs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of control information for sidelink spatial domain multiplexing from multiple TRPs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission. The communications manager 620 may be configured as or otherwise support a means for transmitting a first data packet over the first spatial layer of the sidelink transmission from a first TRP using the set of resources and based on the indication of spatial domain multiplexing. The communications manager 620 may be configured as or otherwise support a means for transmitting a second data packet over the second spatial layer of the sidelink transmission from a second TRP using the set of resources and based on the indication of spatial domain multiplexing.

Additionally or alternatively, the communications manager 620 may support wireless communication at a UE in accordance with examples as disclosed herein. For example, the communications manager 620 may be configured as or otherwise support a means for receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission. The communications manager 620 may be configured as or otherwise support a means for receiving a first data packet over the first spatial layer of the sidelink transmission from a first TRP using the set of resources and based on the indication of spatial domain multiplexing. The communications manager 620 may be configured as or otherwise support a means for receiving a second data packet over the second spatial layer of the sidelink transmission from a second TRP using the set of resources and based on the indication of spatial domain multiplexing.

By including or configuring the communications manager 620 in accordance with examples as described herein, the device 605 (e.g., a processor controlling or otherwise coupled to the receiver 610, the transmitter 615, the communications manager 620, or a combination thereof) may support more efficient sidelink transmissions from multiple TRPs. For example, by providing control information enabling simultaneous SDM sidelink transmissions, a quantity of sidelink transmissions and retransmissions may be reduced, thereby reducing network overhead and improving efficiency. Further, enabling SDM sidelink transmissions according to the techniques described herein may reduce how often a processor of the multi-TRP UE 115 must ramp up to handle signal transmission or retransmission and reception, thereby reducing processing resources at the multi-TRP UE 115 and the receiver UE 115, reducing power consumption, and improving battery performance.

Figure 7:
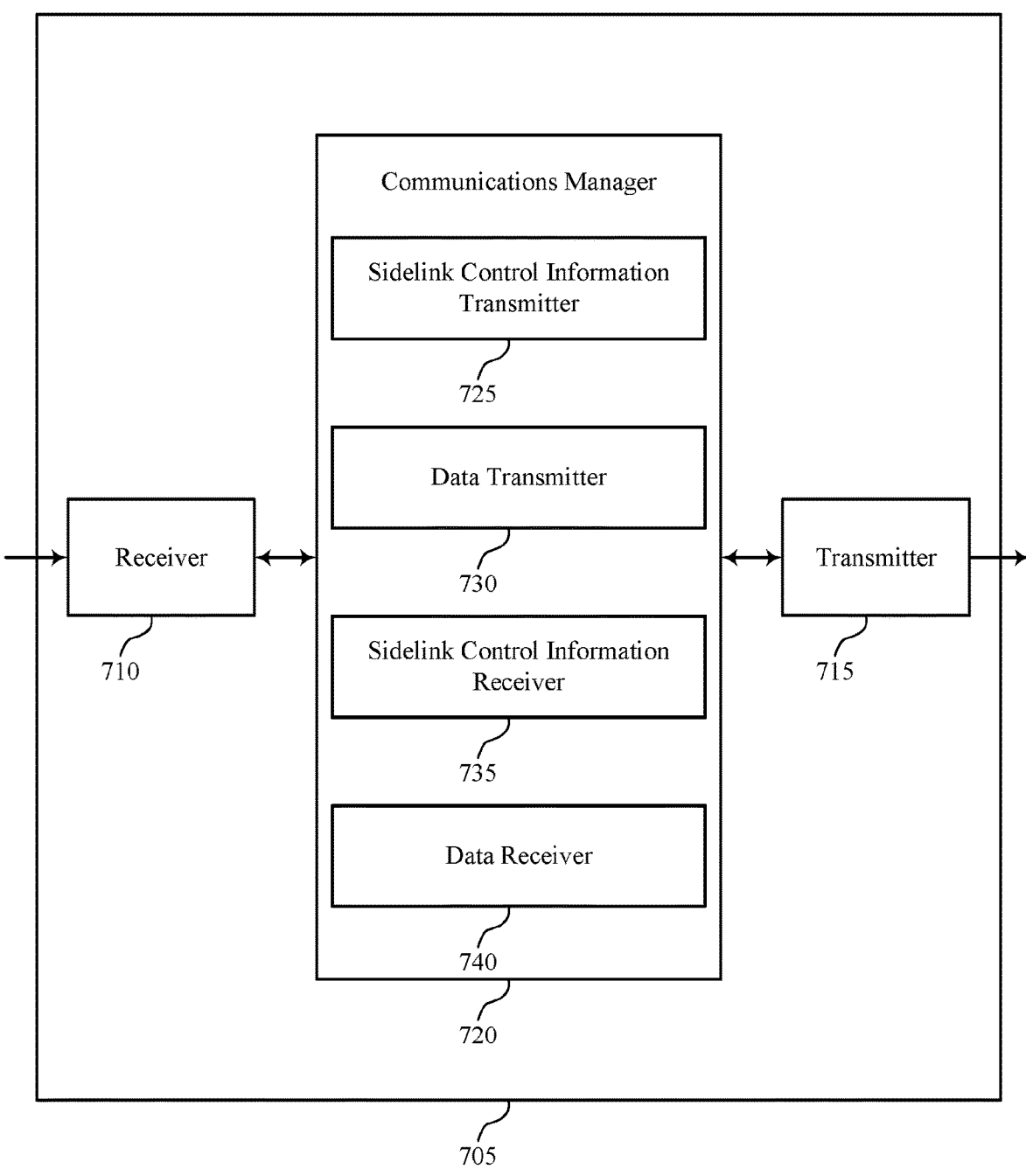

FIG. 7 shows a block diagram 700 of a device 705 that supports control information for sidelink spatial domain multiplexing from multiple TRPs in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to control information for sidelink spatial domain multiplexing from multiple TRPs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to control information for sidelink spatial domain multiplexing from multiple TRPs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of control information for sidelink spatial domain multiplexing from multiple TRPs as described herein. For example, the communications manager 720 may include a sidelink control information transmitter 725, a data transmitter 730, a sidelink control information receiver 735, a data receiver 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The sidelink control information transmitter 725 may be configured as or otherwise support a means for transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission. The data transmitter 730 may be configured as or otherwise support a means for transmitting a first data packet over the first spatial layer of the sidelink transmission from a first TRP using the set of resources and based on the indication of spatial domain multiplexing. The data transmitter 730 may be configured as or otherwise support a means for transmitting a second data packet over the second spatial layer of the sidelink transmission from a second TRP using the set of resources and based on the indication of spatial domain multiplexing.

Additionally or alternatively, the communications manager 720 may support wireless communication at a UE in accordance with examples as disclosed herein. The sidelink control information receiver 735 may be configured as or otherwise support a means for receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission. The data receiver 740 may be configured as or otherwise support a means for receiving a first data packet over the first spatial layer of the sidelink transmission from a first TRP using the set of resources and based on the indication of spatial domain multiplexing. The data receiver 740 may be configured as or otherwise support a means for receiving a second data packet over the second spatial layer of the sidelink transmission from a second TRP using the set of resources and based on the indication of spatial domain multiplexing.

Figure 8:
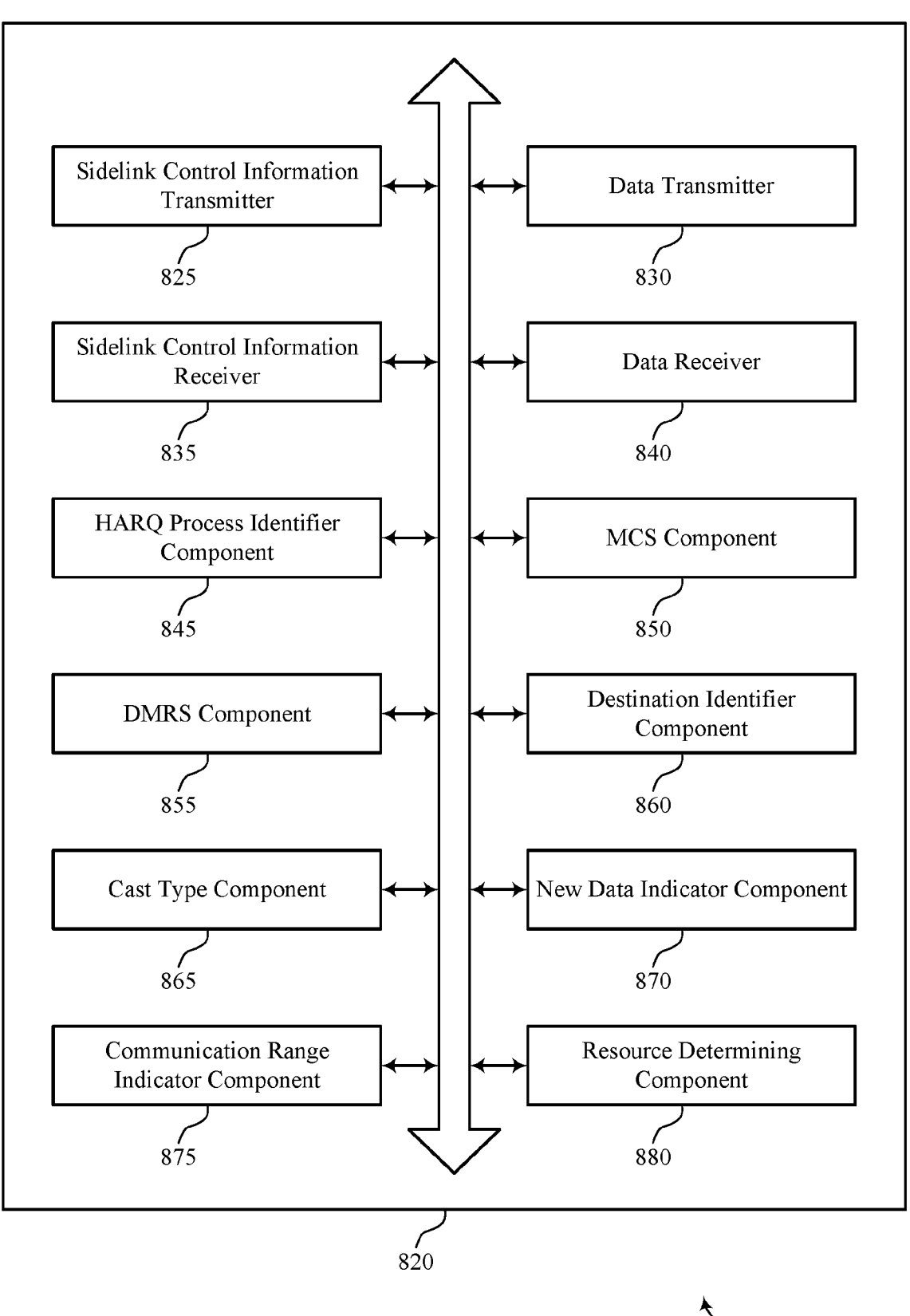
FIG. 8 shows a block diagram of a communications manager that supports control information for sidelink spatial domain multiplexing from multiple TRPs in accordance with aspects of the present disclosure.

FIG. 8 shows a block diagram 800 of a communications manager 820 that supports control information for sidelink spatial domain multiplexing from multiple TRPs in accordance with aspects of the present disclosure. The communications manager 820 may be an example of aspects of a communications manager 620, a communications manager 720, or both, as described herein. The communications manager 820, or various components thereof, may be an example of means for performing various aspects of control information for sidelink spatial domain multiplexing from multiple TRPs as described herein. For example, the communications manager 820 may include a sidelink control information transmitter 825, a data transmitter 830, a sidelink control information receiver 835, a data receiver 840, an HARQ process identifier component 845, an MCS component 850, a DMRS component 855, a destination identifier component 860, a cast type component 865, a new data indicator component 870, a communication range indicator component 875, a resource determining component 880, or any combination thereof. Each of these components may communicate, directly or indirectly, with one another (e.g., via one or more buses).

The communications manager 820 may support wireless communication at a UE in accordance with examples as disclosed herein. The sidelink control information transmitter 825 may be configured as or otherwise support a means for transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission.

The data transmitter 830 may be configured as or otherwise support a means for transmitting a first data packet over the first spatial layer of the sidelink transmission from a first TRP using the set of resources and based on the indication of spatial domain multiplexing. In some examples, the data transmitter 830 may be configured as or otherwise support a means for transmitting a second data packet over the second spatial layer of the sidelink transmission from a second TRP using the set of resources and based on the indication of spatial domain multiplexing.

In some examples, the HARQ process identifier component 845 may be configured as or otherwise support a means for assigning a first HARQ process identifier to the first spatial layer and a second HARQ process identifier to the second spatial layer, where the indication of spatial domain multiplexing includes an indication of the first HARQ process identifier for the first spatial layer and an indication of the second HARQ process identifier for the second spatial layer.

In some examples, the indication of spatial domain multiplexing includes a use of a shared first stage of the sidelink control information and separate second stages of the sidelink control information for the first spatial layer and the second spatial layer.

In some examples, the MCS component 850 may be configured as or otherwise support a means for assigning a common modulation and coding scheme to the first spatial layer and the second spatial layer, where a shared first stage of the sidelink control information signals the common modulation and coding scheme. In some examples, assigning the common modulation and coding scheme is based on a size of the first data packet and a size the second data packet with respect to the set of resources. In some examples, the common modulation and coding scheme corresponds to a subchannel size available for the sidelink transmission.

In some examples, the MCS component 850 may be configured as or otherwise support a means for assigning separate modulation and coding schemes to the first spatial layer and the second spatial layer for decoding respectively the first data packet and the second data packet, where the sidelink control information signals the separate modulation and coding schemes.

In some examples, to support transmitting the sidelink control information, the sidelink control information transmitter 825 may be configured as or otherwise support a means for transmitting a shared first stage of the sidelink control information indicating the separate modulation and coding schemes for the first spatial layer and the second spatial layer.

In some examples, to support transmitting the sidelink control information, the sidelink control information transmitter 825 may be configured as or otherwise support a means for transmitting separate second stages of the sidelink control information for the first spatial layer and the second spatial layer using the respective separate modulation and coding schemes.

In some examples, to support transmitting the sidelink control information, the sidelink control information transmitter 825 may be configured as or otherwise support a means for transmitting a shared first stage of the sidelink control information indicating a common modulation and coding scheme for decoding respective separate second stages of the first spatial layer and the second spatial layer. In some examples, to support transmitting the sidelink control information, the sidelink control information transmitter 825 may be configured as or otherwise support a means for transmitting the respective separate second stages of the sidelink control information using the common modulation and coding scheme, where the second stage of the sidelink control information for the first spatial layer indicates one of the separate modulation and coding schemes for decoding the first data packet, and where the second stage of the sidelink control information for the second spatial layer indicates one of the separate modulation and coding schemes for decoding the second data packet.

In some examples, assigning the separate modulation and coding schemes is based on a size of the first data packet and a size the second data packet with respect to the set of resources.

In some examples, the DMRS component 855 may be configured as or otherwise support a means for assigning different demodulation reference signal ports to the first spatial layer of and the second spatial layer, where the sidelink control information signals the different demodulation reference signal ports.

In some examples, the sidelink control information signals a shared reservation priority of the first spatial layer and the second spatial layer. In some examples, the sidelink control information signals a respective reservation priority of each of the first spatial layer and the second spatial layer.

In some examples, the destination identifier component 860 may be configured as or otherwise support a means for assigning separate destination identifiers to the first spatial layer and the second spatial layer, where the sidelink control information signals the separate destination identifiers.

In some examples, the cast type component 865 may be configured as or otherwise support a means for assigning separate cast types to the first spatial layer and the second spatial layer, where the sidelink control information signals the separate cast types.

In some examples, the new data indicator component 870 may be configured as or otherwise support a means for assigning separate new data indicators to the first spatial layer and the second spatial layer, where the sidelink control information signals the separate new data indicators.

In some examples, the communication range indicator component 875 may be configured as or otherwise support a means for assigning separate communication range indicators to the first spatial layer and the second spatial layer, where the sidelink control information includes the separate communication range indicators.

In some examples, the resource determining component 880 may be configured as or otherwise support a means for determining the set of resources for the sidelink transmission based on a measured signal strength associated with each of the first TRP and the second TRP. In some examples, the set of resources includes a same transmission time interval for the first TRP and the second TRP.

In some examples, to support determining the set of resources, the resource determining component 880 may be configured as or otherwise support a means for selecting a reservation size of the set of resources based on a larger one of the first data packet or the second data packet. In some examples, to support determining the set of resources, the resource determining component 880 may be configured as or otherwise support a means for adjusting a resource exclusion signal strength threshold to enable transmission of the first spatial stream at the first TRP and the second spatial stream at the second TRP.

Additionally or alternatively, the communications manager 820 may support wireless communication at a UE in accordance with examples as disclosed herein. The sidelink control information receiver 835 may be configured as or otherwise support a means for receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission. The data receiver 840 may be configured as or otherwise support a means for receiving a first data packet over the first spatial layer of the sidelink transmission from a first TRP using the set of resources and based on the indication of spatial domain multiplexing. In some examples, the data receiver 840 may be configured as or otherwise support a means for receiving a second data packet over the second spatial layer of the sidelink transmission from a second TRP using the set of resources and based on the indication of spatial domain multiplexing.

In some examples, the HARQ process identifier component 845 may be configured as or otherwise support a means for assigning a first HARQ process identifier to the first spatial layer and a second HARQ process identifier to the second spatial layer, where the indication of spatial domain multiplexing includes an indication of the first HARQ process identifier for the first spatial layer and an indication of the second HARQ process identifier for the second spatial layer.

In some examples, the indication of spatial domain multiplexing includes a use of a shared first stage of the sidelink control information and separate second stages of the sidelink control information for the first spatial layer and the second spatial layer.

In some examples, to support receiving the sidelink control information, the MCS component 850 may be configured as or otherwise support a means for determining a common modulation and coding scheme to the first spatial layer and the second spatial layer, where the sidelink control information signals the common modulation and coding scheme.

In some examples, to support receiving the sidelink control information, the MCS component 850 may be configured as or otherwise support a means for determining separate modulation and coding schemes to the first spatial layer and the second spatial layer, where the sidelink control information signals the separate modulation and coding schemes.

In some examples, to support receiving the sidelink control information, the DMRS component 855 may be configured as or otherwise support a means for determining different demodulation reference signal ports to the first spatial layer of and the second spatial layer, where the sidelink control information signals the different demodulation reference signal ports.

In some examples, the sidelink control information signals a shared reservation priority of the first spatial layer and the second spatial layer. In some examples, the sidelink control information signals a respective reservation priority of each of the first spatial layer and the second spatial layer.

In some examples, to support receiving the sidelink control information, the destination identifier component 860 may be configured as or otherwise support a means for determining respective destination identifiers for the first spatial layer and the second spatial layer, where the sidelink control information signals the separate destination identifiers.

In some examples, to support receiving the sidelink control information, the cast type component 865 may be configured as or otherwise support a means for determining respective cast types of the first spatial layer and the second spatial layer, where the sidelink control information signals the respective cast types.

In some examples, to support receiving the sidelink control information, the new data indicator component 870 may be configured as or otherwise support a means for receiving new data indicators to the first spatial layer and the second spatial layer, where the sidelink control information signals the separate new data indicators.

In some examples, the communication range indicator component 875 may be configured as or otherwise support a means for assigning separate communication range indicators to the first spatial layer and the second spatial layer, where the sidelink control information includes the separate communication range indicators.

Figure 9:
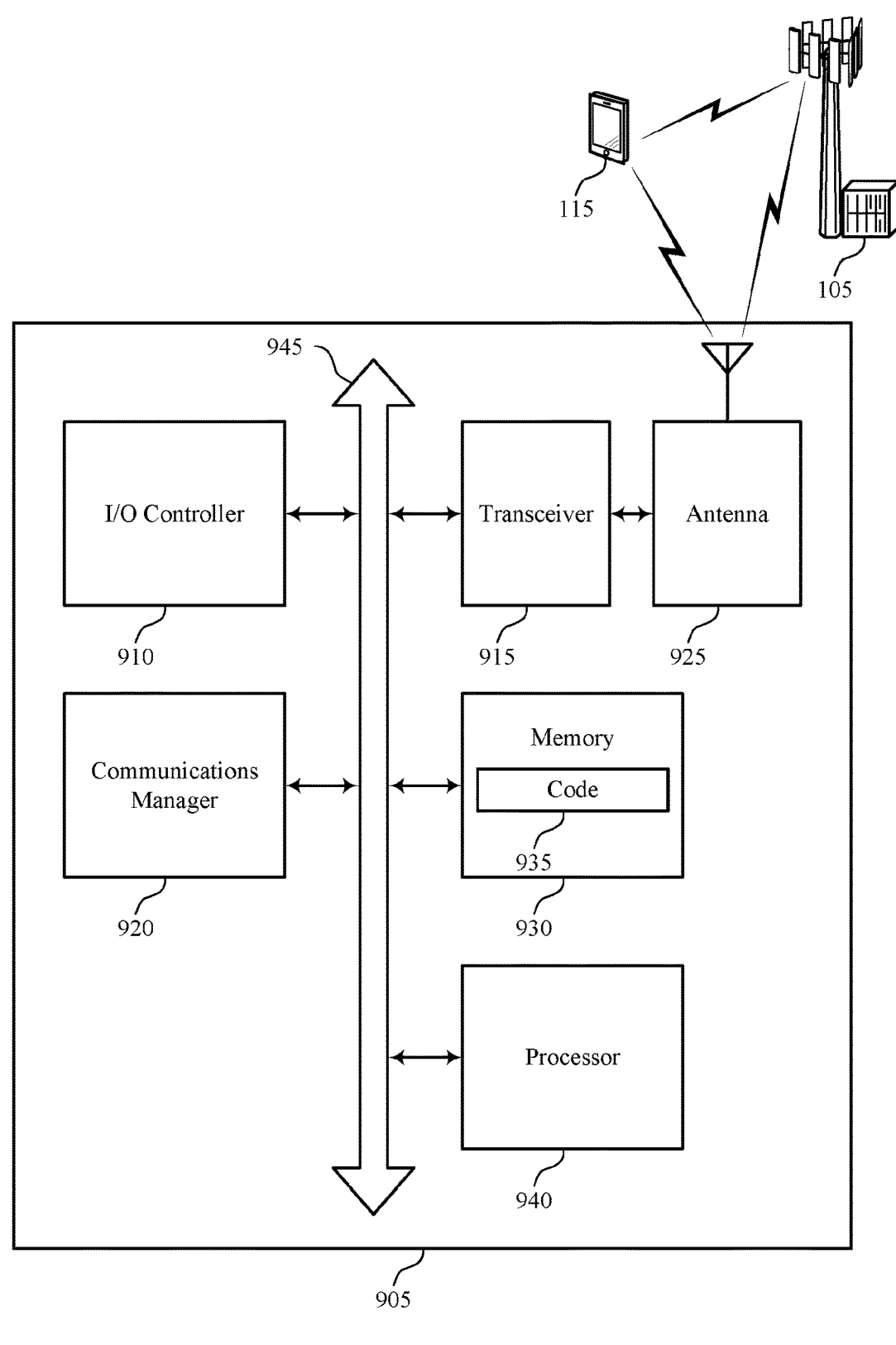
FIG. 9 shows a diagram of a system including a device that supports control information for sidelink spatial domain multiplexing from multiple TRPs in accordance with aspects of the present disclosure.

FIG. 9 shows a diagram of a system 900 including a device 905 that supports control information for sidelink spatial domain multiplexing from multiple TRPs in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting control information for sidelink spatial domain multiplexing from multiple TRPs). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission. The communications manager 920 may be configured as or otherwise support a means for transmitting a first data packet over the first spatial layer of the sidelink transmission from a first TRP using the set of resources and based on the indication of spatial domain multiplexing. The communications manager 920 may be configured as or otherwise support a means for transmitting a second data packet over the second spatial layer of the sidelink transmission from a second TRP using the set of resources and based on the indication of spatial domain multiplexing.

Additionally or alternatively, the communications manager 920 may support wireless communication at a UE in accordance with examples as disclosed herein. For example, the communications manager 920 may be configured as or otherwise support a means for receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission. The communications manager 920 may be configured as or otherwise support a means for receiving a first data packet over the first spatial layer of the sidelink transmission from a first TRP using the set of resources and based on the indication of spatial domain multiplexing. The communications manager 920 may be configured as or otherwise support a means for receiving a second data packet over the second spatial layer of the sidelink transmission from a second TRP using the set of resources and based on the indication of spatial domain multiplexing.

By including or configuring the communications manager 920 in accordance with examples as described herein, the device 905 may support improved techniques for directional sidelink transmission in the context of multi-TRP UEs 115. For example, by enabling the use of a sidelink control information that supports simultaneous SDM sidelink transmissions, a quantity of sidelink transmissions and retransmissions may be reduced, thereby reducing network overhead, increasing coverage area, and improving efficiency. Moreover, by enabling simultaneous SDM sidelink transmissions, aspects of the present disclosure provides for reduced quantities of sidelink transmissions and retransmissions, thereby reducing processing resources at the multi-TRP UE 115 and the receiver UE 115, reducing power consumption, and improving battery performance.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of control information for sidelink spatial domain multiplexing from multiple TRPs as described herein, or the processor 940 and the memory 930 may be otherwise configured to perform or support such operations.

FIG. 10 shows a flowchart illustrating a method 1000 that supports control information for sidelink spatial domain multiplexing from multiple TRPs in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission. The operations of 1005 may be performed in accordance with examples as disclosed herein. In some examples, aspects of the operations of 1005 may be performed by a sidelink control information transmitter 825 as described with reference to FIG. 8.

At 1010, the method may include transmitting a first data packet over the first spatial layer of the sidelink transmission from a first TRP using the set of resources and based on the indication of spatial domain multiplexing. The operations of 1010 may be performed in accordance with examples as disclosed herein. In some examples, aspects of the operations of 1010 may be performed by a data transmitter 830 as described with reference to FIG. 8.

At 1015, the method may include transmitting a second data packet over the second spatial layer of the sidelink transmission from a second TRP using the set of resources and based on the indication of spatial domain multiplexing. The operations of 1015 may be performed in accordance with examples as disclosed herein. In some examples, aspects of the operations of 1015 may be performed by a data transmitter 830 as described with reference to FIG. 8.

FIG. 11 shows a flowchart illustrating a method 1100 that supports control information for sidelink spatial domain multiplexing from multiple TRPs in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include transmitting sidelink control information signaling a set of resources and a number of spatial layers for a sidelink transmission by the UE, where the sidelink control information includes an indication of spatial domain multiplexing between a first spatial layer of the sidelink transmission and a second spatial layer of the sidelink transmission. The operations of 1105 may be performed in accordance with examples as disclosed herein. In some examples, aspects of the operations of 1105 may be performed by a sidelink control information transmitter 825 as described with reference to FIG. 8.

At 1110, the method may include assigning a first HARQ process identifier to the first spatial layer and a second HARQ process identifier to the second spatial layer, where the indication of spatial domain multiplexing includes an indication of the first HARQ process identifier for the first spatial layer and an indication of the second HARQ process identifier for the second spatial layer. The operations of 1110 may be performed in accordance with examples as disclosed herein. In some examples, aspects of the operations of 1110 may be performed by an HARQ process identifier component 845 as described with reference to FIG. 8.

At 1115, the method may include assigning a common modulation and coding scheme to the first spatial layer and the second spatial layer, where a shared first stage of the sidelink control information signals the common modulation and coding scheme. The operations of 1115 may be performed in accordance with examples as disclosed herein. In some examples, aspects of the operations of 1115 may be performed by an MCS component 850 as described with reference to FIG. 8.

At 1120, the method may include transmitting a first data packet over the first spatial layer of the sidelink transmission from a first TRP using the set of resources and based on the indication of spatial domain multiplexing. The operations of 1120 may be performed in accordance with examples as disclosed herein. In some examples, aspects of the operations of 1120 may be performed by a data transmitter 830 as described with reference to FIG. 8.

At 1125, the method may include transmitting a second data packet over the second spatial layer of the sidelink transmission from a second TRP using the set of resources and based on the indication of spatial domain multiplexing. The operations of 1125 may be performed in accordance with examples as disclosed herein. In some examples, aspects of the operations of 1125 may be performed by a data transmitter 830 as described with reference to FIG. 8.

Figure 12:
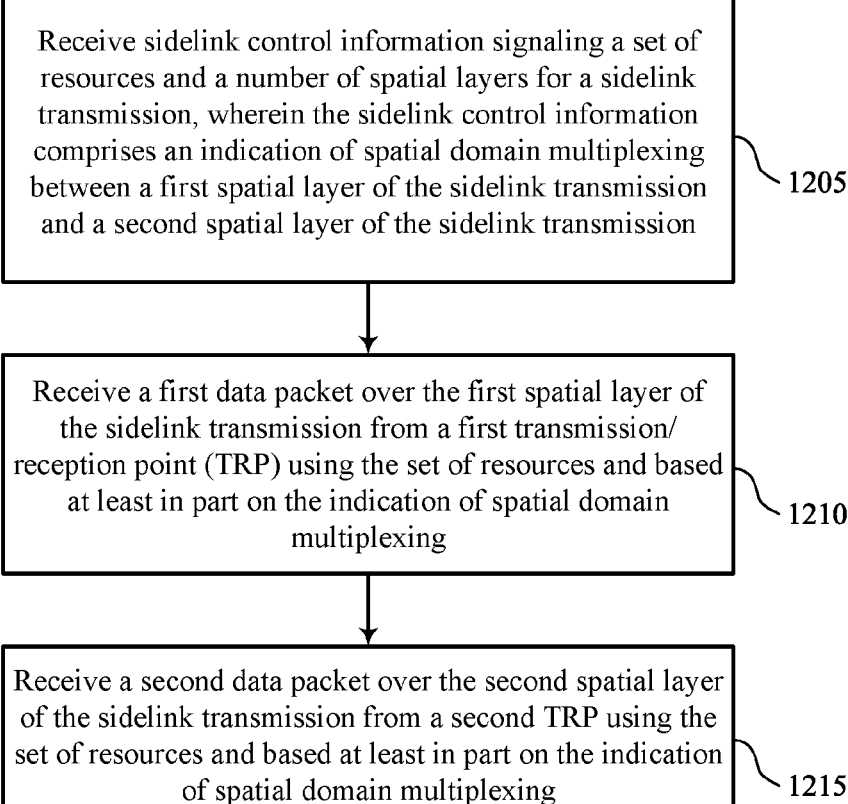

FIG. 12 shows a flowchart illustrating a method 1200 that supports control information for sidelink spatial domain multiplexing from multiple TRPs in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission. The operations of 1205 may be performed in accordance with examples as disclosed herein. In some examples, aspects of the operations of 1205 may be performed by a sidelink control information receiver 835 as described with reference to FIG. 8.

At 1210, the method may include receiving a first data packet over the first spatial layer of the sidelink transmission from a first TRP using the set of resources and based on the indication of spatial domain multiplexing. The operations of 1210 may be performed in accordance with examples as disclosed herein. In some examples, aspects of the operations of 1210 may be performed by a data receiver 840 as described with reference to FIG. 8.

At 1215, the method may include receiving a second data packet over the second spatial layer of the sidelink transmission from a second TRP using the set of resources and based on the indication of spatial domain multiplexing. The operations of 1215 may be performed in accordance with examples as disclosed herein. In some examples, aspects of the operations of 1215 may be performed by a data receiver 840 as described with reference to FIG. 8.

Figure 13:
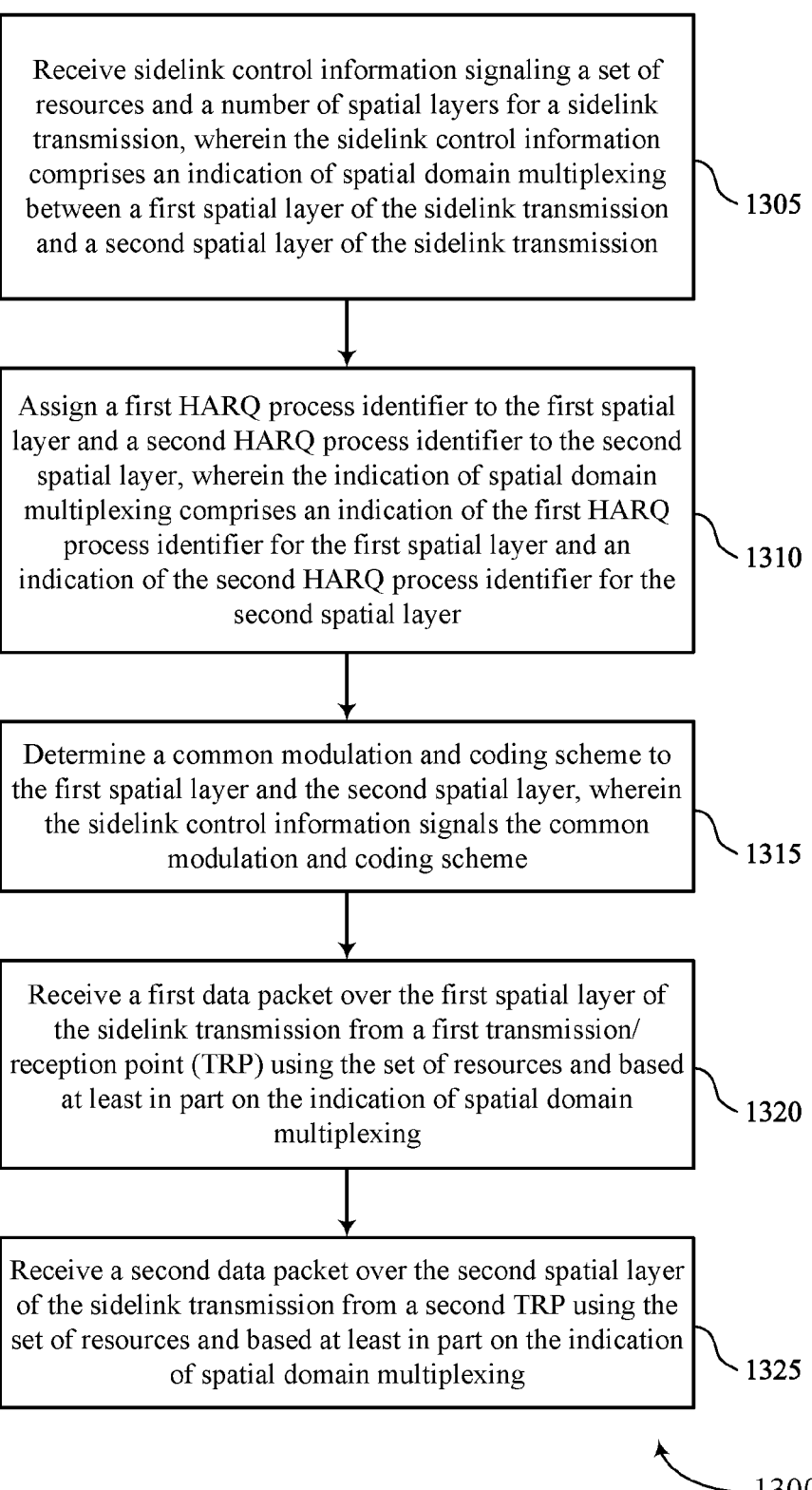

FIG. 13 shows a flowchart illustrating a method 1300 that supports control information for sidelink spatial domain multiplexing from multiple TRPs in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving sidelink control information signaling a set of resources and a number of spatial layers for a sidelink transmission, where the sidelink control information includes an indication of spatial domain multiplexing between a first spatial layer of the sidelink transmission and a second spatial layer of the sidelink transmission. The operations of 1305 may be performed in accordance with examples as disclosed herein. In some examples, aspects of the operations of 1305 may be performed by a sidelink control information receiver 835 as described with reference to FIG. 8.

At 1310, the method may include assigning a first HARQ process identifier to the first spatial layer and a second HARQ process identifier to the second spatial layer, where the indication of spatial domain multiplexing includes an indication of the first HARQ process identifier for the first spatial layer and an indication of the second HARQ process identifier for the second spatial layer. The operations of 1310 may be performed in accordance with examples as disclosed herein. In some examples, aspects of the operations of 1310 may be performed by an HARQ process identifier component 845 as described with reference to FIG. 8.

At 1315, the method may include determining a common modulation and coding scheme to the first spatial layer and the second spatial layer, where the sidelink control information signals the common modulation and coding scheme. The operations of 1315 may be performed in accordance with examples as disclosed herein. In some examples, aspects of the operations of 1315 may be performed by an MCS component 850 as described with reference to FIG. 8.

At 1320, the method may include receiving a first data packet over the first spatial layer of the sidelink transmission from a first TRP using the set of resources and based on the indication of spatial domain multiplexing. The operations of 1320 may be performed in accordance with examples as disclosed herein. In some examples, aspects of the operations of 1320 may be performed by a data receiver 840 as described with reference to FIG. 8.

At 1325, the method may include receiving a second data packet over the second spatial layer of the sidelink transmission from a second TRP using the set of resources and based on the indication of spatial domain multiplexing. The operations of 1325 may be performed in accordance with examples as disclosed herein. In some examples, aspects of the operations of 1325 may be performed by a data receiver 840 as described with reference to FIG. 8.

The following provides an overview of aspects of the present disclosure:

Aspect 1: A method for wireless communication at a UE, comprising: transmitting sidelink control information signaling a set of resources and a number of spatial layers for a sidelink transmission by the UE, wherein the sidelink control information comprises an indication of spatial domain multiplexing between a first spatial layer of the sidelink transmission and a second spatial layer of the sidelink transmission; transmitting a first data packet over the first spatial layer of the sidelink transmission from a first transmission/reception point (TRP) using the set of resources and based at least in part on the indication of spatial domain multiplexing; and transmitting a second data packet over the second spatial layer of the sidelink transmission from a second TRP using the set of resources and based at least in part on the indication of spatial domain multiplexing.

Aspect 2: The method of aspect 1, further comprising: assigning a first HARQ process identifier to the first spatial layer and a second HARQ process identifier to the second spatial layer, wherein the indication of spatial domain multiplexing comprises an indication of the first HARQ process identifier for the first spatial layer and an indication of the second HARQ process identifier for the second spatial layer.

Aspect 3: The method of any of aspects 1 through 2, wherein the indication of spatial domain multiplexing comprises a use of a shared first stage of the sidelink control information and separate second stages of the sidelink control information for the first spatial layer and the second spatial layer.

Aspect 4: The method of any of aspects 1 through 3, further comprising: assigning a common modulation and coding scheme to the first spatial layer and the second spatial layer, wherein a shared first stage of the sidelink control information signals the common modulation and coding scheme.

Aspect 5: The method of aspect 4, wherein assigning the common modulation and coding scheme is based at least in part on a size of the first data packet and a size the second data packet with respect to the set of resources.

Aspect 6: The method of any of aspects 4 through 5, wherein the common modulation and coding scheme corresponds to a subchannel size available for the sidelink transmission.

Aspect 7: The method of any of aspects 1 through 3, further comprising: assigning separate modulation and coding schemes to the first spatial layer and the second spatial layer for decoding respectively the first data packet and the second data packet, wherein the sidelink control information signals the separate modulation and coding schemes.

Aspect 8: The method of aspect 7, wherein transmitting the sidelink control information comprises: transmitting a shared first stage of the sidelink control information indicating the separate modulation and coding schemes for the first spatial layer and the second spatial layer.

Aspect 9: The method of aspect 8, wherein transmitting the sidelink control information further comprises: transmitting separate second stages of the sidelink control information for the first spatial layer and the second spatial layer using the respective separate modulation and coding schemes.

Aspect 10: The method of any of aspects 7 through 9, wherein transmitting the sidelink control information comprises: transmitting a shared first stage of the sidelink control information indicating a common modulation and coding scheme for decoding respective separate second stages of the first spatial layer and the second spatial layer; and transmitting the respective separate second stages of the sidelink control information using the common modulation and coding scheme, wherein the second stage of the sidelink control information for the first spatial layer indicates one of the separate modulation and coding schemes for decoding the first data packet, and wherein the second stage of the sidelink control information for the second spatial layer indicates one of the separate modulation and coding schemes for decoding the second data packet.

Aspect 11: The method of any of aspects 7 through 10, wherein assigning the separate modulation and coding schemes is based at least in part on a size of the first data packet and a size the second data packet with respect to the set of resources.

Aspect 12: The method of any of aspects 1 through 11, further comprising: assigning different demodulation reference signal ports to the first spatial layer of and the second spatial layer, wherein the sidelink control information signals the different demodulation reference signal ports.

Aspect 13: The method of any of aspects 1 through 12, wherein the sidelink control information signals a shared reservation priority of the first spatial layer and the second spatial layer.

Aspect 14: The method of any of aspects 1 through 13, wherein the sidelink control information signals a respective reservation priority of each of the first spatial layer and the second spatial layer.

Aspect 15: The method of any of aspects 1 through 14, further comprising: assigning separate destination identifiers to the first spatial layer and the second spatial layer, wherein the sidelink control information signals the separate destination identifiers.

Aspect 16: The method of any of aspects 1 through 15, further comprising: assigning separate cast types to the first spatial layer and the second spatial layer, wherein the sidelink control information signals the separate cast types.

Aspect 17: The method of any of aspects 1 through 16, further comprising: assigning separate new data indicators to the first spatial layer and the second spatial layer, wherein the sidelink control information signals the separate new data indicators.

Aspect 18: The method of any of aspects 1 through 17, further comprising: assigning separate communication range indicators to the first spatial layer and the second spatial layer, wherein the sidelink control information comprises the separate communication range indicators.

Aspect 19: The method of any of aspects 1 through 18, further comprising: determining the set of resources for the sidelink transmission based at least in part on a measured signal strength associated with each of the first TRP and the second TRP.

Aspect 20: The method of aspect 19, wherein the set of resources comprises a same transmission time interval for the first TRP and the second TRP.

Aspect 21: The method of any of aspects 19 through 20, wherein determining the set of resources comprises: selecting a reservation size of the set of resources based at least in part on a larger one of the first data packet or the second data packet.

Aspect 22: The method of any of aspects 19 through 21, wherein determining the set of resources comprises: adjusting a resource exclusion signal strength threshold to enable transmission of the first spatial stream at the first TRP and the second spatial stream at the second TRP.

Aspect 23: A method for wireless communication at a UE, comprising: receiving sidelink control information signaling a set of resources and a number of spatial layers for a sidelink transmission, wherein the sidelink control information comprises an indication of spatial domain multiplexing between a first spatial layer of the sidelink transmission and a second spatial layer of the sidelink transmission; receiving a first data packet over the first spatial layer of the sidelink transmission from a first transmission/reception point (TRP) using the set of resources and based at least in part on the indication of spatial domain multiplexing; and receiving a second data packet over the second spatial layer of the sidelink transmission from a second TRP using the set of resources and based at least in part on the indication of spatial domain multiplexing.

Aspect 24: The method of aspect 23, further comprising: assigning a first HARQ process identifier to the first spatial layer and a second HARQ process identifier to the second spatial layer, wherein the indication of spatial domain multiplexing comprises an indication of the first HARQ process identifier for the first spatial layer and an indication of the second HARQ process identifier for the second spatial layer.

Aspect 25: The method of any of aspects 23 through 24, wherein the indication of spatial domain multiplexing comprises a use of a shared first stage of the sidelink control information and separate second stages of the sidelink control information for the first spatial layer and the second spatial layer.

Aspect 26: The method of any of aspects 23 through 25, wherein receiving the sidelink control information comprises: determining a common modulation and coding scheme to the first spatial layer and the second spatial layer, wherein the sidelink control information signals the common modulation and coding scheme.

Aspect 27: The method of any of aspects 23 through 25, wherein receiving the sidelink control information comprises: determining separate modulation and coding schemes to the first spatial layer and the second spatial layer, wherein the sidelink control information signals the separate modulation and coding schemes.

Aspect 28: The method of any of aspects 23 through 27, wherein receiving the sidelink control information comprises: determining different demodulation reference signal ports to the first spatial layer of and the second spatial layer, wherein the sidelink control information signals the different demodulation reference signal ports.

Aspect 29: The method of any of aspects 23 through 28, wherein the sidelink control information signals a shared reservation priority of the first spatial layer and the second spatial layer.

Aspect 30: The method of any of aspects 23 through 29, wherein the sidelink control information signals a respective reservation priority of each of the first spatial layer and the second spatial layer.

Aspect 31: The method of any of aspects 23 through 30, wherein receiving the sidelink control information comprises: determining respective destination identifiers for the first spatial layer and the second spatial layer, wherein the sidelink control information signals the separate destination identifiers.

Aspect 32: The method of any of aspects 23 through 31, wherein receiving the sidelink control information comprises: determining respective cast types of the first spatial layer and the second spatial layer, wherein the sidelink control information signals the respective cast types.

Aspect 33: The method of any of aspects 23 through 32, wherein receiving the sidelink control information comprises: receiving new data indicators to the first spatial layer and the second spatial layer, wherein the sidelink control information signals the separate new data indicators.

Aspect 34: The method of any of aspects 23 through 33, further comprising: assigning separate communication range indicators to the first spatial layer and the second spatial layer, wherein the sidelink control information comprises the separate communication range indicators.

Aspect 35: An apparatus for wireless communication at a UE, comprising a processor; memory coupled with the processor; and instructions stored in the memory and executable by the processor to cause the apparatus to perform a method of any of aspects 1 through 22.

Aspect 36: An apparatus for wireless communication at a UE, comprising at least one means for performing a method of any of aspects 1 through 22.

Aspect 37: A non-transitory computer-readable medium storing code for wireless communication at a UE, the code comprising instructions executable by a processor to perform a method of any of aspects 1 through 22.

Aspect 38: An apparatus for wireless communication at a UE, comprising a processor; memory coupled with the processor; and instructions stored in the memory and executable by the processor to cause the apparatus to perform a method of any of aspects 23 through 34.

Aspect 39: An apparatus for wireless communication at a UE, comprising at least one means for performing a method of any of aspects 23 through 34.

Aspect 40: A non-transitory computer-readable medium storing code for wireless communication at a UE, the code comprising instructions executable by a processor to perform a method of any of aspects 23 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one processor;

at least one memory coupled with the at least one processor; and instructions stored in the at least one memory and executable by the at least one processor to cause the UE to:

transmit sidelink control information signaling a set of resources and a number of spatial layers for a sidelink transmission by the UE, wherein the sidelink control information comprises an indication of spatial domain multiplexing between a first spatial layer of the sidelink transmission and a second spatial layer of the sidelink transmission and comprises an indication of one or more reservation priorities for the first spatial layer and the second spatial layer;

assign one or more modulation and coding schemes to the first spatial layer and the second spatial layer for decoding a first data packet mapped to the first spatial layer and a second data packet mapped to the second spatial layer;

transmit the first data packet over the first spatial layer of the sidelink transmission from a first transmission reception point (TRP) using the set of resources and based at least in part on the indication of spatial domain multiplexing; and transmit the second data packet over the second spatial layer of the sidelink transmission from a second TRP using the set of resources and based at least in part on the indication of spatial domain multiplexing.

2. The UE of claim 1, wherein the instructions are further executable by the at least one processor to cause the UE to:

assign a first hybrid automatic repeat request (HARQ) process identifier to the first spatial layer and a second HARQ process identifier to the second spatial layer, wherein the indication of spatial domain multiplexing comprises an indication of the first HARQ process identifier for the first spatial layer and an indication of the second HARQ process identifier for the second spatial layer.

3. The UE of claim 1, wherein the indication of spatial domain multiplexing comprises a use of a shared first stage of the sidelink control information and separate second stages of the sidelink control information for the first spatial layer and the second spatial layer.

4. The UE of claim 1, wherein the one or more modulation and coding schemes include a common modulation and coding scheme to the first spatial layer and the second spatial layer, wherein a shared first stage of the sidelink control information signals the common modulation and coding scheme.

5. The UE of claim 4, wherein assigning the common modulation and coding scheme is based at least in part on a size of the first data packet and a size of the second data packet with respect to the set of resources.

6. The UE of claim 4, wherein the common modulation and coding scheme corresponds to a subchannel size available for the sidelink transmission.

7. The UE of claim 1, wherein the one or more modulation and coding schemes include separate modulation and coding schemes to the first spatial layer and the second spatial layer for decoding respectively the first data packet and the second data packet, wherein the sidelink control information signals the separate modulation and coding schemes.

8. The UE of claim 7, wherein the instructions to transmit the sidelink control information are executable by the at least one processor to cause the UE to:

transmit a shared first stage of the sidelink control information indicating the separate modulation and coding schemes for the first spatial layer and the second spatial layer.

9. The UE of claim 8, wherein the instructions to transmit the sidelink control information are further executable by the at least one processor to cause the UE to:

transmit separate second stages of the sidelink control information for the first spatial layer and the second spatial layer using the separate modulation and coding schemes.

10. The UE of claim 7, wherein the instructions to transmit the sidelink control information are executable by the at least one processor to cause the UE to:

transmit a shared first stage of the sidelink control information indicating a common modulation and coding scheme for decoding respective separate second stages of the sidelink control information for the first spatial layer and the second spatial layer; and transmit the respective separate second stages of the sidelink control information using the common modulation and coding scheme, wherein the respective separate second stages of the sidelink control information include a second stage of the sidelink control information for the first spatial layer that indicates one of the separate modulation and coding schemes for decoding the first data packet and a second stage of the sidelink control information for the second spatial layer that indicates one of the separate modulation and coding schemes for decoding the second data packet.

11. The UE of claim 7, wherein assigning the separate modulation and coding schemes is based at least in part on a size of the first data packet and a size the second data packet with respect to the set of resources.

12. The UE of claim 1, wherein the instructions are further executable by the at least one processor to cause the UE to:

assign different demodulation reference signal ports to the first spatial layer and the second spatial layer, wherein the sidelink control information signals the different demodulation reference signal ports.

13. The UE of claim 1, wherein the one or more reservation priorities comprise a shared reservation priority of the first spatial layer and the second spatial layer.

14. The UE of claim 1, wherein the one or more reservation priorities comprise a respective reservation priority of each of the first spatial layer and the second spatial layer.

15. The UE of claim 1, wherein the instructions are further executable by the at least one processor to cause the UE to:

assign separate destination identifiers to the first spatial layer and the second spatial layer, wherein the sidelink control information signals the separate destination identifiers.

16. The UE of claim 1, wherein the instructions are further executable by the at least one processor to cause the UE to:

assign separate cast types to the first spatial layer and the second spatial layer, wherein the sidelink control information signals the separate cast types.

17. The UE of claim 1, wherein the instructions are further executable by the at least one processor to cause the UE to:

assign separate new data indicators to the first spatial layer and the second spatial layer, wherein the sidelink control information signals the separate new data indicators.

18. The UE of claim 1, wherein the instructions are further executable by the at least one processor to cause the UE to:

assign separate communication range indicators to the first spatial layer and the second spatial layer, wherein the sidelink control information comprises the separate communication range indicators.

19. The UE of claim 1, wherein the instructions are further executable by the at least one processor to cause the UE to:

determine the set of resources for the sidelink transmission based at least in part on a measured signal strength associated with each of the first TRP and the second TRP.

20. The UE of claim 19, wherein the set of resources comprises a same transmission time interval for the first TRP and the second TRP.

21. The UE of claim 19, wherein the instructions to determine the set of resources are executable by the at least one processor to cause the UE to:

select a reservation size of the set of resources based at least in part on a larger one of the first data packet or the second data packet.

22. The UE of claim 19, wherein the instructions to determine the set of resources are executable by the at least one processor to cause the UE to:

adjust a resource exclusion signal strength threshold to enable transmission of the first spatial layer at the first TRP and the second spatial layer at the second TRP.

23. A user equipment (UE) for wireless communication, comprising:

at least one processor;

at least one memory coupled with the at least one processor; and instructions stored in the at least one memory and executable by the at least one processor to cause the UE to:

receive sidelink control information signaling a set of resources and a number of spatial layers for a sidelink transmission, wherein the sidelink control information comprises an indication of spatial domain multiplexing between a first spatial layer of the sidelink transmission and a second spatial layer of the sidelink transmission and comprises an indication of one or more reservation priorities for the first spatial layer and the second spatial layer;

determine one or more common modulation and coding schemes to the first spatial layer and the second spatial layer for decoding a first data packet mapped to the first spatial layer and a second data packet mapped to the second spatial layer;

receive the first data packet over the first spatial layer of the sidelink transmission from a first transmission reception point (TRP) using the set of resources and based at least in part on the indication of spatial domain multiplexing; and receive the second data packet over the second spatial layer of the sidelink transmission from a second TRP using the set of resources and based at least in part on the indication of spatial domain multiplexing.

24. The UE of claim 23, wherein the instructions are further executable by the at least one processor to cause the UE to:

assign a first hybrid automatic repeat request (HARQ) process identifier to the first spatial layer and a second HARQ process identifier to the second spatial layer, wherein the indication of spatial domain multiplexing comprises an indication of the first HARQ process identifier for the first spatial layer and an indication of the second HARQ process identifier for the second spatial layer.

25. The UE of claim 23, wherein the indication of spatial domain multiplexing comprises a use of a shared first stage of the sidelink control information and separate second stages of the sidelink control information for the first spatial layer and the second spatial layer.

26. The UE of claim 23, wherein the one or more common modulation and coding schemes include a common modulation and coding scheme to the first spatial layer and the second spatial layer, wherein the sidelink control information signals the common modulation and coding scheme.

27. The UE of claim 23, wherein the one or more common modulation and coding schemes include separate modulation and coding schemes to the first spatial layer and the second spatial layer, wherein the sidelink control information signals the separate modulation and coding schemes.

28. The UE of claim 23, wherein the instructions to receive the sidelink control information are executable by the at least one processor to cause the UE to:

determine different demodulation reference signal ports to the first spatial layer and the second spatial layer, wherein the sidelink control information signals the different demodulation reference signal ports.

29. The UE of claim 23, wherein the one or more reservation priorities comprise a shared reservation priority of the first spatial layer and the second spatial layer.

30. The UE of claim 23, wherein the one or more reservation priorities comprise a respective reservation priority of each of the first spatial layer and the second spatial layer.

* * * * *